United States Patent [19]

Nakanishi et al.

[11] Patent Number: 5,760,850
[45] Date of Patent: Jun. 2, 1998

[54] PROJECTION TYPE IMAGE DISPLAY APPARATUS

[75] Inventors: Hiroshi Nakanishi, Sakurai; Hiroshi Hamada, Nara; Takashi Shibatani; Yoshihiro Mizuguchi, both of Tenri; Hiromi Kato, Nara, all of Japan

[73] Assignee: Sharp Kabushiki Kaisha, Japan

[21] Appl. No.: 599,320

[22] Filed: Feb. 9, 1996

[30] Foreign Application Priority Data

| Feb. 10, 1995 | [JP] | Japan | 7-022995 |
| Apr. 27, 1995 | [JP] | Japan | 7-104436 |
| Nov. 21, 1995 | [JP] | Japan | 7-303200 |

[51] Int. Cl.⁶ .................. G02F 1/1335; G02F 1/1333
[52] U.S. Cl. .................. 349/5; 349/106; 349/112; 349/159; 359/15
[58] Field of Search .................. 359/40, 41, 68, 359/69, 42, 15; 349/5, 106, 112, 159

[56] References Cited

U.S. PATENT DOCUMENTS

| 4,372,639 | 2/1983 | Johnson | 350/331 |
| 4,832,427 | 5/1989 | Namba et al. | 350/174 |
| 5,161,042 | 11/1992 | Hamada . | |
| 5,300,942 | 4/1994 | Dolgoff | 345/32 |
| 5,442,467 | 8/1995 | Silverstein et al. | 359/42 |
| 5,506,701 | 4/1996 | Ichikawa | 359/15 |
| 5,548,349 | 8/1996 | Mizuguchi et al. | 348/766 |

FOREIGN PATENT DOCUMENTS

| 55-135808 | 10/1980 | Japan . |
| 59-230383 | 12/1984 | Japan . |
| 61-64158 | 4/1986 | Japan . |
| 3248125 | 11/1991 | Japan . |
| 5249318 | 9/1993 | Japan . |
| 6222361 | 8/1994 | Japan . |
| 7181487 | 7/1995 | Japan . |

OTHER PUBLICATIONS

M. Oikawa et al., Applied Optics, vol. 21, No. 6, pp. 1052–1056, 1982 Distributed-index planar microlens.

M. Oikawa et al., Electronics Letters, vol. 17, No. 13, pp. 452–454, 1981 Distributed-Index Planar Microlens Array Prepared From Deep Electromigration.

Z.D. Popovic et al., Applied Optics, vol. 27, No. 7, pp. 1281–1284, 1988 "Technique for monolithic fabrication of microlens arrays".

Primary Examiner—William L. Sikes
Assistant Examiner—Julie Ngo
Attorney, Agent, or Firm—David G. Conlin; John L. Welch

[57] ABSTRACT

A projection type color image display apparatus includes: a light source for emitting white light; a first optical element for dividing the white light into a plurality of colored lights and for converging each colored light to form a plurality of spots, the spots of each colored light being formed at different positions from the spots of the other colored light; a liquid crystal display element including a plurality of pixels, the pixels corresponding to the spots and modulating the respective colored lights, whereby an image displayed by the liquid crystal display element is carried by the colored lights; a second optical element for diffracting the colored lights modulated by the liquid crystal display element to make a principal ray of each colored light substantially parallel to a principal ray of the other colored light; and a third optical element for receiving the colored lights from the second optical element and for projecting the image displayed by the liquid crystal display element while the image is enlarged.

14 Claims, 23 Drawing Sheets

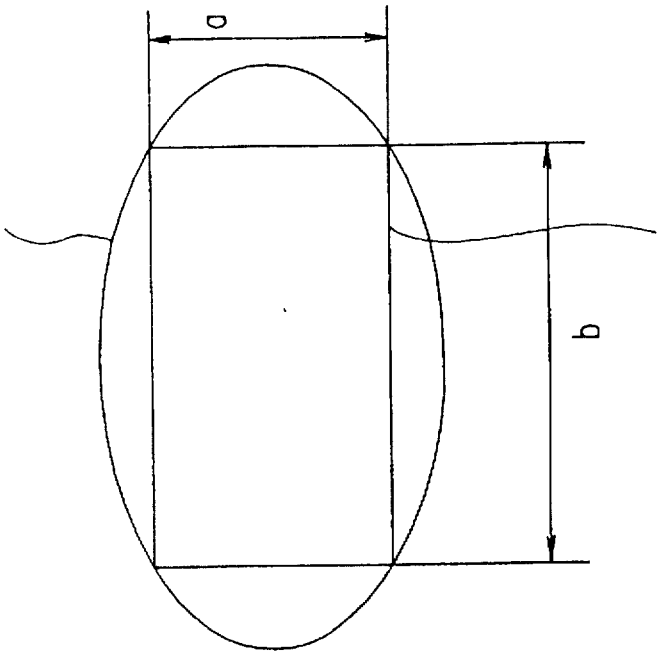
FIG. 19A Section of light irradation
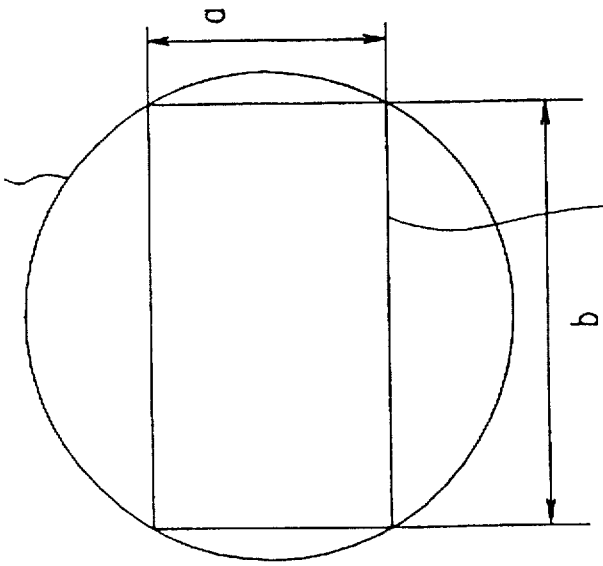
FIG. 19B Section of light irradation

PROJECTION TYPE IMAGE DISPLAY APPARATUS

BACKGROUND OF THE INVENTION

1. Field of the Invention:

The present invention relates to a projection type color image display apparatus of a single-element system for displaying a color image by using one liquid crystal display element without using a color filter having a mosaic pattern. More particularly, it relates to a projection type color image display apparatus applicable to a compact projection type color liquid crystal television system or a compact image display system.

2. Description of the Related Art:

A conventional projection type display apparatus will be first described. There is great expectation of further development of a liquid crystal display element used in a projection type display apparatus for the following reason. Although a liquid crystal display element requires a separate light source because it is not self-luminous, it has excellent properties, as compared with a cathode ray tube used in a projection type cathode ray tube display apparatus, such as a wide color reproduction range, portability owing to its small size and weight, and no need of convergence adjustment.

A projection type color image display system using such a liquid crystal display element is classified into two systems, one of which is a three-element system using three liquid crystal display elements respectively corresponding to the three primary colors, the other of which is a single-element system using merely one liquid crystal display element. In the former three-element system, a projection type color image display apparatus comprises an optical system for separating white light into color light of the three primary colors, red, green and blue, and liquid crystal display elements for forming an image by controlling the color light, so that images of the three colors are optically superimposed to obtain a full color display image. In this system, although the light emitted by a white light source can be effectively utilized, the optical system has a complicated configuration including a large number of components. Accordingly, the three-element system is disadvantageous in view of production cost and compactness when compared with the latter single-element system.

In a projection type color image display apparatus of a single-element system, an image formed on a liquid crystal display element using a three-primary-color filter having a mosaic or stripe pattern is projected by a projection optical system. Such a color image display apparatus is disclosed in, for example, Japanese Laid-Open Patent Publication No. 59-230383. The color image display apparatus of the single-element system is suitable to a compact projection system with a low cost because it includes merely one liquid crystal element and the optical system therein has a simplified configuration as compared with that of the three-element system. This system is display apparatus, however, has another problem that only approximately one-third of incident light can be utilized due to the color filter and the remaining two-thirds of the light is absorbed or reflected by the color filter. In other words, the screen of the display apparatus of the single-element system has a brightness of approximately one-third of that of the display apparatus of the three-element system using an equivalent light source.

The brightness of the screen can be improved by using a brighter light source, but such a light source having a large power consumption is not preferred for domestic use. In addition, when a color filter of an absorption type is used, the energy of light absorbed by the color filter is changed into heat. Therefore, a brighter light source can not only increase the temperature of the liquid crystal display element but also accelerates color fade of the color filter.

Accordingly, it is important to effectively use the given light for improvement of the usefulness of a projection type color image display apparatus.

As a countermeasure against this disadvantage of the single-element system, Japanese Laid-Open Patent Publication No. 4-60538 discloses a color image display apparatus in which a plurality of dichroic mirrors are disposed in a fanwise manner so as to increase the light utilization ratio.

FIG. 22 is a schematic diagram showing a configuration of a projection type color liquid crystal display apparatus of the single-element system disclosed in Japanese Laid-Open Patent Publication No. 4-60538. Light is emitted by a white light source 101 and is changed into substantially collimated white beams by a spherical mirror 102 and a condenser lens 103. On the optical axis of the white beams are disposed three dichroic mirrors 114R, 114G and 114B at respectively different angles against the optical axis in a fanwise manner. The dichroic mirrors 114R, 114G and 114B selectively reflect beams in the wavelength ranges of red, green and blue light, respectively and transmit beams in the other wavelength ranges, and are formed by a known multi-layer thin film coating technique. In the following description, the primary colors of red, green and blue are referred to as R, G and B, respectively A microlens array 107 is disposed on one surface, which is close to the light source, of a liquid crystal display element 10B. The microlens array 107 receives the R, G and B beams obtained by the dichroic mirrors 114R, 114G and 114n, respectively, so as to distribute the beams to respective liquid crystal portions (pixels), which are driven by display electrodes independently supplied with corresponding color signals, and so as to converge the beams on apertures of the pixels. The pitch of the microlenses of the microlens array 107 corresponds to the pitch of groups of three pixels for R, G and B of the liquid crystal display element 108. The beams having passed through the liquid crystal display element 108 are projected on a projection screen 111 by a field lens 109 and a projection lens 110.

In the projection type color liquid crystal display apparatus of the single-element system shown in FIG. 22, the light utilization ratio is improved due to the absence of a color filter. This display apparatus, however, has the following problems.

The white light is separated into respective color beams by the dichroic mirrors 114R, 114G and 114B that respectively reflect light components in predetermined wavelength ranges. Therefore, the optical paths of the beams are bent. This makes large the area occupied by the optical system. Furthermore, since the dichromic mirrors 114R, 114G and 114B are disposed with their mirror faces tilted against the optical axis of the white light, the surface areas of the dichromic mirrors 114R, 114G and 114B are required to be larger than those of the mirrors disposed perpendicularly to the optical axis. This results in a higher cost of the optical components.

In addition, the respective color beams obtained by the dichromic mirrors 114R, 114G and 114B enter the liquid crystal display element 108 at different angles. Therefore, it is necessary to adjust the positions of the dichromic mirrors 114R, 114G and 114B so that the respective color beams overlap one another on the liquid crystal display element 108. This is necessary in order to prevent white balance from being degraded due to the change of the mixing ratio of the R, G and B beams on the surface of the liquid crystal display element 108.

In the projection type color image display apparatus of the single-element system disclosed in Japanese Laid-Open Patent Publication No. 4-60538, the respective color beams exit at different angles from the liquid crystal display element, and the entire light expands significantly wider. FIG. 23A shows the exit angles of the respective color beams.

In order to project all the beams exiting from the liquid crystal display element on the screen, it is necessary to use A projection lens having a large aperture (i.e., having a small F-number) as that shown in FIG. 23B as a larger circle. However, a projection lens with a smaller F-number is more difficult to produce, which is one of the reasons for the high production cost. When a projection lens having a sufficiently larger F-number for reducing production cost, that is, a projection lens with a smaller aperture shown as a smaller circle in FIG. 23B, is used, eclipse of the R and B beams is caused at the pupil positions of the projection lens (as is shown with cross-hatching in FIG. 23B), thereby decreasing the amount of these color beams reaching the screen.

Furthermore, among the light sources generally used in a liquid crystal projector, a metal halide lamp and a halogen lamp have irregular spectral distribution. Specifically, red is weak in the spectral distribution of a metal halide lamp owing to a lack of a bright line spectrum in the wavelength range of the red light, and blue is weak in that of a halogen lamp owing to a lack of a bright line spectrum in the wavelength range of the blue light. Therefore, when the projection lens with a small aperture is used together with such a lamp, the white balance is largely shifted to green because the red or blue beam which is inherently weak is further eclipsed at the pupil positions of the projection lens. Thus, when a projection type color image display apparatus of the single-element system of Japanese Laid-open Patent Publication No. 4-60538 is used with a light source having irregular spectral distribution and a projection lens having a sufficiently large F-number for reducing the production cost, the white balance is disadvantageously degraded because of eclipse at the pupil positions of the projection lens.

Alternatively, Japanese Laid-Open Patent Publication No. 6-222361 discloses another system for improving the light utilization ratio. In this system, a holographic element including a substrate on which a hologram for separating white light into color beams and converging the color beams on the apertures of the pixels is formed is applied to a liquid crystal display element for direct viewing. FIG. 24 is a diagram showing an example disclosed in Japanese Laid-Open Patent Publication No. 6-222361. As is shown in FIG. 24, a halographic element 114 is disposed on the incident side of a liquid crystal display element 115. This holographic is element 114 is of a type that diffracts incident light in all the wavelength ranges. When white light enters the holographic element 114, components of the white light are diffracted at different angles in accordance with the wavelength thereof. Also, the holographic element 114 has a function which can converge the beams so as to have the same pitches that of a group of three pixels for R, G and B of the liquid crystal display element 115, and owing to this function, each color beam is converged on the apertures of pixels for the corresponding color of the liquid crystal display element 115.

In another example of Japanese Laid-Open Patent Publication No. 6-222361, incident beams are converged by a microlens array having the same pitch of microlenses as that of the group of the three pixels for R, G and B, and the converged beams are diffracted at different angles depending upon the wavelength by means of a holographic element disposed behind the microlens array, so as to distribute the beams on the apertures of the pixels for R, G and B. The liquid crystal display element 115 used in Japanese Laid-Open Patent Publication No. 6-222361 is provided with a color filter 116.

In still another example of Japanese Laid-Open Patent Publication No. 6-222361, a holographic element having a hologram for diffracting the beams at different angles depending upon the wavelength and another holographic element having a hologram for converging the beams are separately provided.

Japanese Laid-Open Patent Publication No. 5-249318 discloses usage of a holographic element on which a hologram having wavelength selectivity is recorded instead of a dichroic mirror. FIG. 25 shows the schematic configuration of a projection type liquid crystal display apparatus described in this publication. Holographic elements 204, 205 and 206 are disposed on the optical path of white beams with their grating faces positioned perpendicularly to the optical axis of the white beams exiting from a condenser lens 203, so as to diffract the beams in the wavelength ranges of red, green and blue in different directions. The diffracted color beams are converged on corresponding pixels of a liquid crystal display element 208 by a microlens array 207, so as to be modulated by the liquid crystal display element 208. A full color image thus displayed on the liquid crystal display element 208 is projected on a projection screen 211 through a field lens 209 and a projection lens 210.

The disadvantages of the apparatuses of Japanese Laid-Open Patent Publication No. 6-222361 will now be described. Although the light utilization ratio is improved in these apparatuses, they have the following problems:

(1) The hologram of the holographic element 114 is required to have a uniform pitch in order to converge the beams as described above. Therefore, it is necessary to positionally align the holographic element 114 with the pixels of the liquid crystal display element 115 with high precision. The holographic element 114, however, has an additional function of color separation as compared with the microlens array which merely has a function of converging white beams, and hence, this additional function can disturb the accurate positioning with regard to the liquid crystal display element 115. In particular, each of the microlens array, the holographic element and the liquid crystal display element has a uniform pitch, and hence it is very difficult to accurately adjust the positional relationship among these elements.

(2) After an original is produced, a holographic element can be advantageously mass-produced by copying the original. However, in order to reproduce a convergence state equivalent to that of the microlens array, the holographic element 114 is required to converge the beams correspondingly to the pixels of the liquid crystal display elements Therefore, it is necessary to conduct a plurality of exposure. This complicates the production procedure and leads to difficulty in the production of the original holographic element.

(3) In the apparatus where the beams are converged by the microlens array and are separated into color beams by the holographic element disposed behind the microlens array, the respective beams have different incident angles in entering the holographic element, resulting in slightly different diffraction angles. This makes larger a convergence spot on the aperture of the pixel. In order to compensate for the large spot, it is necessary to make an interference fringe on the holographic element have a pitch in accordance with microlenses in the microlens array. The disadvantage of such a pitch of the hologram of the holographic element is described in item (1) above.

Furthermore, in the projection type liquid crystal display apparatus disclosed in Japanese Laid-Open Patent Publication No. 5-249318, it is actually difficult to diffract 100% of the beams in a desired wavelength range by the holographic element. In an actual projection type liquid crystal display apparatus, there also exists light having different wavelength and incident angle from the design wavelength and the design incident angle of the holographic element. As the difference is larger, the diffraction efficiency of the holographic element is more degraded. Therefore, light exists which is not diffracted but goes straight. As a result, light not corresponding to an applied color signal enters a pixel, and the color purity of the display image is degraded.

The white light emitted by the light source is changed generally by means of a reflecting mirror or the like into collimated beams having a circular section. The display portion of the liquid crystal display element is generally in the shape of a rectangular. Therefore, a large portion of light does not irradiate the display portion. Thus, the light emitted by the white light source cannot be effectively utilized.

SUMMARY OF THE INVENTION

A projection type color image display apparatus comprises a light source for emitting white light; first optical means for dividing the white light into a plurality of colored lights and for converging each of the plurality of colored lights to form a plurality of spots, the spots of each of the plurality of colored lights being formed at different positions from the spots of the other of the plurality of colored lights; a liquid crystal display element including a plurality of pixels, the pixels corresponding to the plurality of spots formed by the first optical means and modulating the respective plurality of colored lights, whereby an image displayed by the liquid crystal display element is carried by the plurality of colored lights; second optical means for diffracting the plurality of colored lights modulated by the liquid crystal display element to make a principal ray of each of the plurality of colored lights substantially parallel to a principal ray of the other of the plurality of colored lights; and third optical means for receiving the plurality of colored lights from the second optical means and for projecting the image displayed by the liquid crystal display element while the image is enlarged.

In one embodiment of the invention, the second optical means includes two or more holographic elements for diffracting two or more of the plurality of colored lights different from one another, an angle of diffraction of each of the holographic elements being different from an angle of diffraction of the other holographic elements.

In another embodiment of the invention, the second optical means includes a holographic element for diffracting two or more of the plurality of colored lights at different angles.

In another aspect of the invention, the projection type color image display apparatus comprises: a liquid crystal display element, including a plurality of pixels, for displaying an image; a light source for emitting a white light; optical means including at least one hologram having a wavelength selectivity and diffracting the white light to direct a plurality of colored lights toward different directions; an array of micro-optical elements for converging each of the plurality of colored lights onto corresponding pixels of the liquid crystal display element; end projection means for receiving the image from the liquid crystal display element and for projecting the image, the projection means including at least a lens, wherein the optical means allows one of the plurality of colored lights having the weakest emission spectrum of the light source so to enter the liquid crystal display element substantially perpendicularly thereto.

In one embodiment of the invention, the optical means includes two or more holographic elements for diffracting two or more of the plurality of colored lights different from one another, an angle of diffraction of each of the holographic elements being different from an angle of diffraction of the other holographic elements.

In another embodiment of the invention, the optical means includes a holographic element for diffracting two or more of the plurality of colored lights at different angles.

In still another aspect of the invention, the projection type color image display apparatus comprises: a liquid crystal display element, including a plurality of pixels, for displaying an image; a light source for emitting a white light; optical means for receiving the white light and for diffracting a plurality of colored lights toward different directions; an array of micro-optical elements for converging each of the plurality of colored lights onto corresponding pixels of the liquid crystal display element; and projection means for receiving the image from the liquid crystal display element and for projecting the image displayed by the liquid crystal display element, the projection means including at least a lens, wherein the white light is incident on the optical means at an angle determined to prevent zero-order diffracted lights of the plurality of colored lights from entering an incident pupil of the lens of the projection means.

In one embodiment of the invention, the white light is incident on the optical means at an angle $\alpha°$ determined by:

$$\alpha° < \tan^{-1}(\phi/2L) + \tan^{-1}(p/2f)$$

where a distance between the optical means and the projection means is L, an effective aperture of the lens of the projection means is $\phi$, a focal length of each of the micro-optical elements is f, and a pitch of the micro-optical elements is p.

In another embodiment of the invention, the liquid crystal display element includes a display portion having a vertical length of a and a horizontal length of b; and wherein, when a <b, the white light is incident on the optical means in a horizontal direction at an angle $\alpha°$ satisfying the relationship:

$$\cos^{-1}(a/b) - 15° < \alpha° < \cos^{-1}(a/b) + 10°,$$

and when a>b, the white light is incident on the optical means in a vertical direction at an angle $\alpha°$ satisfying the relationships:

$$\cos^{-1}(b/a) - 15° < \alpha° < \cos^{-1}(b/a) + 10°.$$

In still another embodiment of the invention, the optical means includes a plurality of holographic elements each having a hologram for diffracting one of the plurality of colored lights, whereby the plurality of colored lights are diffracted by different holographic elements.

In yet another embodiment of the invention, the optical means, includes a holographic element having a plurality of holograms each of which diffracts one of the plurality of colored lights.

Thus, the invention described herein makes possible the advantages of (1) providing a compact and light projection type color image display apparatus which can be produced at a low cost; and (2) providing a projection type color image display apparatus having improved color purity of a display image and an increased light utilization ratio of a light source.

These and other advantages of the present invention will become apparent to those skilled in the art upon reading and understanding the following detailed description with reference to the accompanying figures.

BRIEF DESCRIPTION OF THE DRAWINGS

FIGS. 19A and 19B illustrate white light irradiating a liquid crystal display element used in a sixth example of the projection type color image display apparatus of the invention;

DESCRIPTION OF PREFERRED EMBODIMENTS

The projection type color image display apparatus of the invention will now be described referring to the accompanying drawings.

Figure 4:
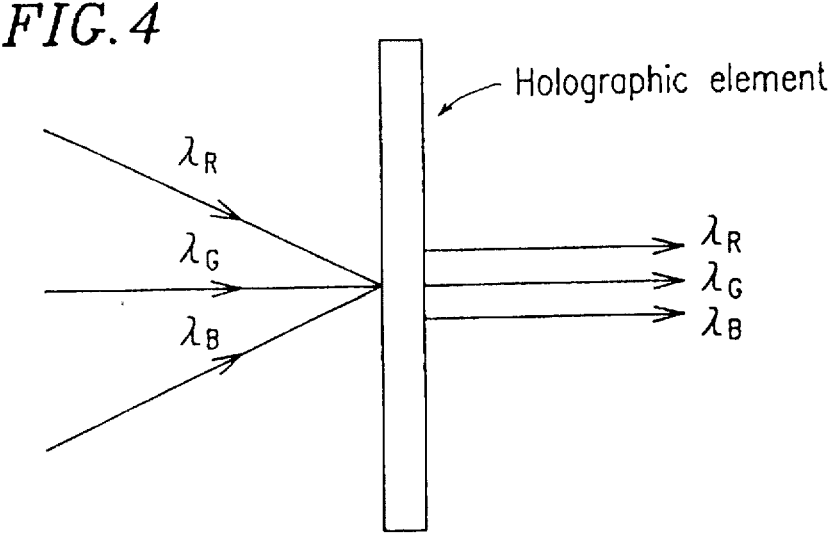
FIG. 4 illustrates the operation of each holographic element used in the projection type color image display apparatus of FIG. 1.

In Examples 1 and 2 of the projection type color image display apparatus of the invention, color beams having passed through a liquid crystal display element diverge thereafter, but the principal rays of the respective color beams are collimated by a holographic element, as second optical means, having different diffraction angles depending upon the wavelengths As a result, secondary images of the light source images of the respective color beams are formed at the same point on the pupil position of a projection lens. Specifically, as is shown in FIG. 4, beams having wavelength of $\lambda_R$, $\lambda_G$ and $\lambda_B$, which have entered the holographic element at different angles, exit at the same angle. As a result, diverged light, which cannot be conventionally used without a projection lens with a large aperture, can enter a projection lens having a comparatively small aperture. This results in a compact and light display apparatus as well as a low production cost of the projection lens.

Figure 5:
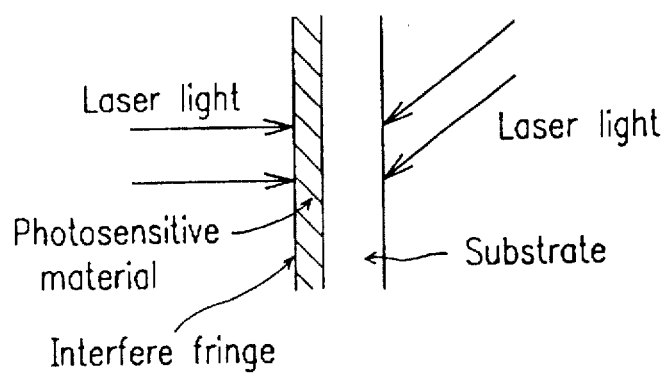
FIG. 5 illustrates a production method for the holographic element of FIG. 4.

The holographic element used in the present projection type color image display apparatus can be produced by recording Interfere fringes of two beams on a recording substrate as is shown in FIG. 5. The incident angles of the two beams are set so that interfere fringes satisfying the Bragg condition can be formed by the light in a used wavelength range, as is described in "Laser and Image" (written by Shizuo Tatsuoke, Kyoritsu Shuppan, pp. 77–81).

(EXAMPLE 1)

Now, a first example of the projection type color image display apparatus of the invention will be described.

Figure 1:
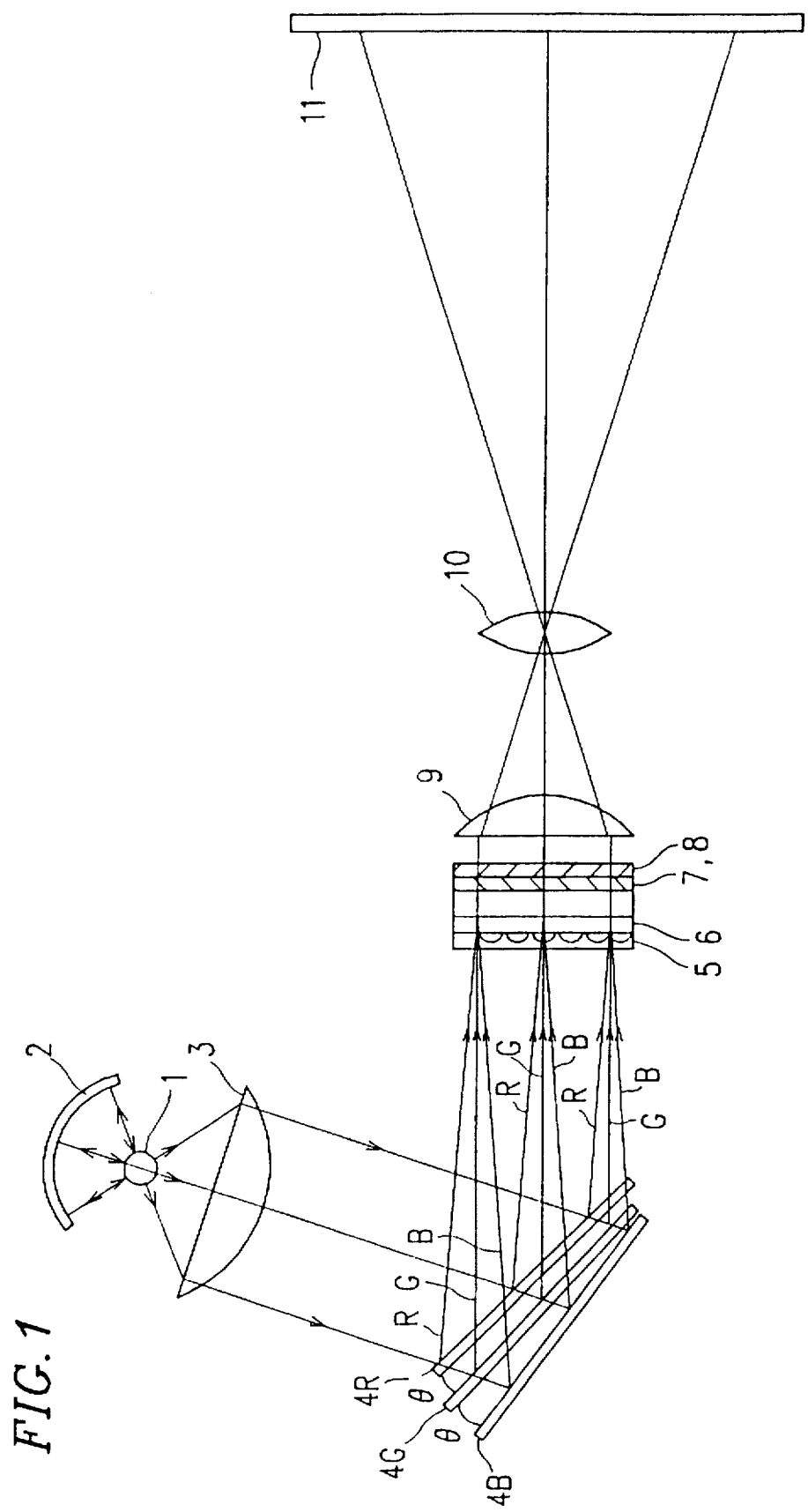
FIG. 1 is a schematic diagram showing the configuration of a first example of a projection type color image display apparatus of the invention.

FIG. 1 is a schematic diagram of the entire configuration of the projection type color image display apparatus of this example. The present color image display apparatus comprises a white light source 1 used together with a spherical mirror 2, a condenser lens 3, three dichroic mirrors 4R, 4G and 4B, a liquid crystal display element 6 with a microlens array 5, holographic element 7 for R beams, holographic element 8 for B beams, a projection optical system including a field lens 9 and a projection lens 10, and a projection screen 11. Each of the holographic elements 7 and 8 includes a substrate on which a hologram which diffracts only the corresponding color beams is formed.

As the white light source 1, a metal halide lamp of 150 W having an arc length of 5 mm is herein used. Other light sources such as a halogen lamp and a xenon lamp are also applicable. The spherical mirror 2 is disposed behind the light source 1, in front of which is disposed the condenser lens 3 having an aperture of 80 mm$\phi$ and a focal length $f_c$ of 60 mm. The spherical mirror 2 is positioned so that the center thereof corresponds to the center of a light emitting portion of the light source 1. The condenser lens 3 is positioned so that the focal point thereof corresponds to the center of the light emitting portion of the light source 1.

Beams exiting from the condenser lens 3 are substantially collimated. The condenser lens 3 is not the only means for obtaining collimated beams from the light source 1, but a paraboloid mirror or a combination of a spheroid mirror and an integrator can be appropriately used.

In front of the condenser lens 3 are disposed the three dichroic mirrors 4R, 4G and 4B at different angles. The dichroic mirrors 4R, 4G and 4B selectively reflect beams in the wavelength ranges of red, green and blue light, respectively and transmit beams in the other wavelength ranges, and are disposed in this order on the optical axis. Hereinafter, R, G and B are used to refer to the colors of red, green and blue. These dichroic mirrors 4R, 4G and 4B are manufactured by a known multilayer thin film coating technique. It is preferred that all the dichroic mirrors are designed to transmit infrared radiation so as to suppress the temperature increase at the liquid crystal display element 6.

The dichromic mirrors 4R, 4G and 4B are arranged in this example so that the incident angle of the white beams with respect to the dichromic mirror 4R is approximately 30° and so that those with respect to the dichromic mirrors 4G and 4B are rotated from those against the dichromic mirrors 4R and 4G, respectively by an angle $\theta$ around a rotation axis which is perpendicular to the surface of FIG. 1. The relative angle $\theta$ is expressed by using a pitch P of pixels of the liquid crystal display element 6 described below and a focal length $f\mu$ of the microlens array 5 as follows:

$$\theta = \tan^{-1}(P/f\mu)/2 \quad (1)$$

The dichromic mirrors 4R, 4G and 4B are thus positioned, so that the R, G and B beams enter the microlens array 5 at different angles. In this example, the G beams are positioned at the center of the color beams and allowed to enter the microlens array 5 perpendicularly thereto, and the R and B beams are tilted so as to be symmetrical about the G beams as shown in FIG. 1.

Figure 2:
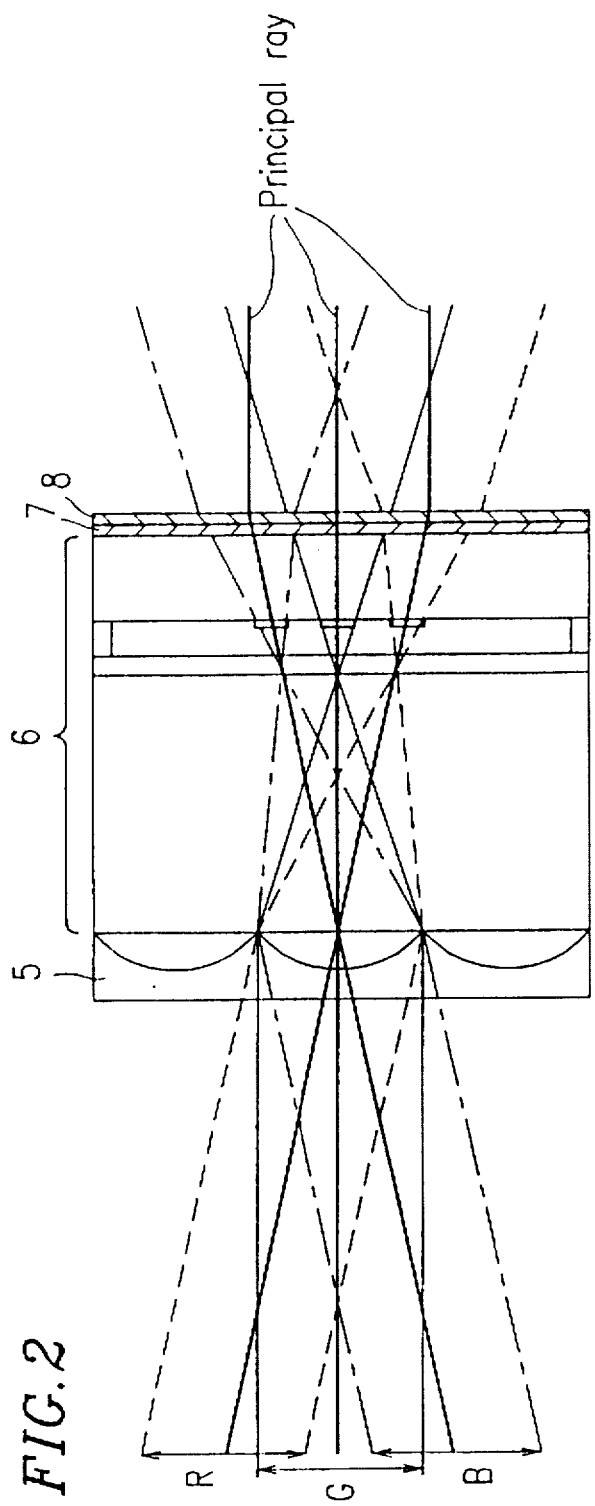
FIG. 2 is a sectional view of the main part of a liquid crystal display element used in the projection type color image display apparatus of FIG. 1.

FIG. 2 is a schematic sectional view of a portion around the liquid crystal display element 6 used in this example. The components of the liquid crystal display element 6 such as a polarizing plate and an alignment film are herein omitted for simplification. The microlens array 5 provided on the incident side of the liquid crystal display element 6 is disposed so that one microlens corresponds to a group of three pixels respectively for R, G and B of the liquid crystal display element 6. The focal length $f\mu$ of the microlens is 720 μm (corresponding to 1.1 mm, that is, the thickness of a counter substrate, within a glass medium).

Figure 3:
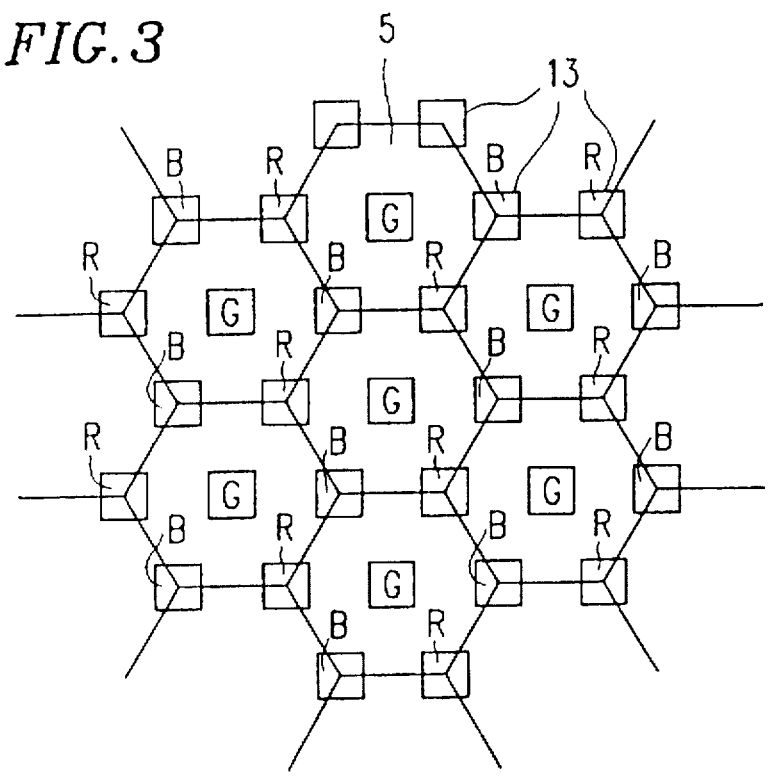
FIG. 3 is a schematic front view of a microlens array and pixel arrangement in the liquid crystal display element used in the projection type color image display apparatus of FIG. 1.

The liquid crystal display element 6 used in this example is an active matrix type liquid crystal display element of a twisted nematic (TN) mode which is dynamically driven through semiconductor thin film transistors (not shown) for switching rectangular pixels 13 arranged in; the form of a delta arrangement matrix shown in FIG. 3. The vertical and horizontal pitch of the pixels is 100 μm, the aperture size of a pixel is 50 μm in length by 70 μm in width, and the number of pixels is 480 in vertical rows by 640 in horizontal columns.

Since the focal length $f\mu$ is 720 μm and the pitch P between the pixels is 100 μm as described above, the relative angle $\theta$ between the adjacent dichromic mirrors is calculated an the basis of Formula (1) as follows: $\theta = \tan^{-1}(100/720)/2 \approx 4°$. Accordingly, the G beams enter the liquid crystal display element 6 perpendicularly thereto, and the R and B beams enter the liquid crystal display element 6 at angles of ±8° with respect to a direction in which the C beams travel, respectively. As a result, the convergence spots of the respective color beams by the microlens array 5 accord with corresponding pixels of the liquid crystal display element 6.

The beams having passed through the liquid crystal display element 6 go through the holographic elements 7 and 8. The holographic elements 7 and 8 diffract only the R and B beams, respectively. More specifically, the holographic element 7 diffracts visual light with a wavelength of approximately 600 nm or more and the holographic element 8 diffracts visual light with a wavelength of approximately 500 nm or less. The diffraction angles of the R and B beams by these holographic elements 7 and 8 are appropriately selected, so as to obtain the same exit angles of the principal rays of the R, G and B beams, which have entered the holographic element at different angles, as is shown in FIG. 4.

In this example, the holographic element 7 for the R beams and the holographic element 8 for the B beams are manufactured as follows. As is shown in FIG. 5, a transparent substrate coated with a photosensitive material for recording a hologram, for example, Omnidex 352 (manufactured by Du Pont), is irradiated with an argon laser (with a wavelength of 514.5 nm). At this point, the argon laser is divided into two beams with a predetermined angle therebetween. The condition of irradiation are controlled depending on the wavelength to which the resultant hologram corresponds, a desired diffraction angle, and so on. An interfere fringe formed through the irradiation is recorded, thereby the holographic element 7 or 8 is obtained. The thus manufactured holographic elements 7 and 8 are overlaid on the surface through which the light exits (hereinafter referred to as the "exit side") of the liquid crystal display element 6.

The material which is used for recording the interfere fringe is a polymer recording film including a monomer, an initiator and a sensitizing pigment. Through the following three procedures, an interfere fringe corresponding to the R beams or B beams can be recorded on the substrate of each holographic element:

(a) Exposure with a laser beam: 20 mJ/cm² (a sum of object beam intensity and reference beam intensity)

(b) Irradiation with UV: 100 mJ/cm²

(c) Heating: 140° C. (for 2 hours)

Initially, the monomer is homogeneously distributed over the recording film. When the recording film is exposed with a laser beam in procedure (a), the monomer is polymerized in an exposed portion, and the unreacted monomer moves from the peripheral portion to the exposed portion. This increases the density of the monomer in the exposed portion and decreases that in the remaining portion. At this point, when the monomer has a refractive index different from that of the polymer, a refractive index distribution corresponding to an interfere fringe is formed.

Then, by irradiating the entire recording film with UV in procedure (b), the polymerization, of the monomer through a red reaction is completed. Finally, the resultant recording film is heated in procedure (c) so as to amplify the modification of the refractive index.

The argon laser, which is used as a light source for recording the interfere fringes on the substrate of the holographic elements, can be replaced with a He-Ne laser, a YAG laser, a Kr laser or the like. Furthermore, as the material for the holographic elements, any materials for manufacturing a three-dimensional hologram such as gelatin bichromate and silver halide can be used, in addition to a photopolymerizable photopolymer as described above.

The holographic element 7 selectively diffracts components in the wavelength range of R, that is, the visible light components having a wavelength of approximately 600 nm or more, so as to make the principal ray of the R beams substantially parallel to the principal ray of the G beams. Similarly, the holographic element 8 selectively diffracts components in the wavelength range of B, that is, the visible light components having a wavelength of approximately 500 nm or less, so as to make the principal ray of the B beams substantially parallel to the principal ray of the G beams. The G beams, which are not diffracted by any of the holographic elements 7 and 8, are transmitted through these holographic elements. Thus, the divergence angles of the principal rays of the R, G and B beams are suppressed. As a result, it is possible to project an image with satisfactory brightness and good white balance even when a projection lens with a comparatively small, aperture is used. In addition, since the holographic elements 7 and 8 are used to make parallel the principal rays of the outgoing beams, the beams are scarcely lost and a diffraction efficiency of 90% or more can be accomplished.

Figure 6:
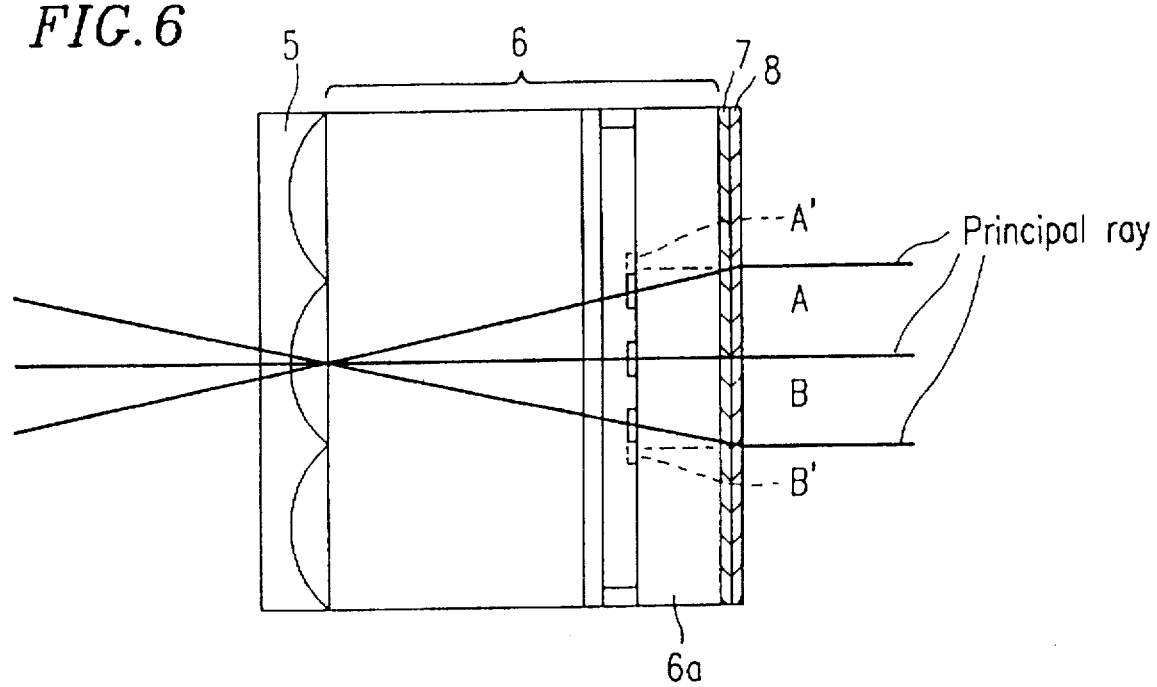
FIG. 6 illustrates parallax caused in the projection type color image display apparatus of FIG. 1.

Furthermore, parallax is caused due to the thickness of a glass substrate 6a of the liquid crystal display element 6 as is shown in FIG. 6. As a result, when an image projected on the screen, pixels on points A and B of FIG. 6 look as if they were shifted to points A' and B'. This can be compensated for by shifting the timing of signal sampling in accordance with the parallax. The same can be also done in Example 2 below.

Since the holographic elements of this example have no periodic structure, there is no need of accurate positional alignment. They are simply adhered to the exit side of the liquid crystal display element or interposed in a predetermined position between the liquid crystal display element and the field lens. This also applies to Example 2.

(EXAMPLE 2)

Figure 7:
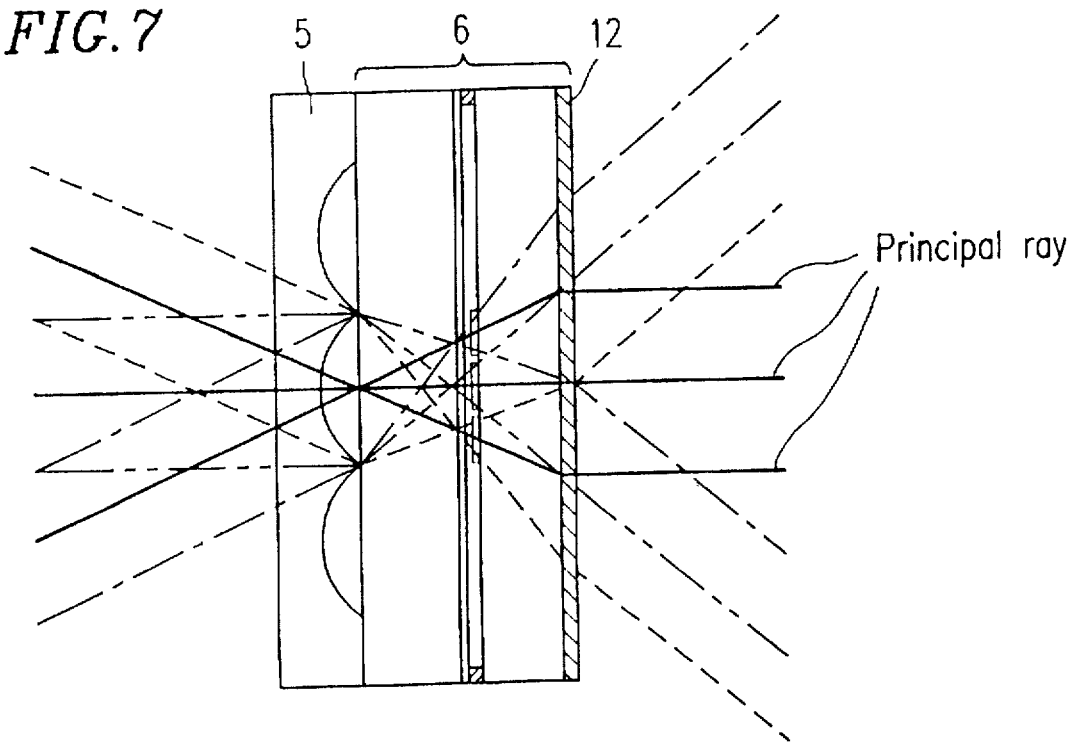
FIG. 7 is a diagram showing a portion around a multiple type holographic element used in a second example of the projection type color image display apparatus of the invention.

FIG. 7 is a diagram showing a portion around a holographic element used in a projection type color image display apparatus of Example 2. In this example, a holographic element 12 having two interfere fringes recorded on one substrate is used, whereas two holographic elements 7 and B each having one interfere fringe on one substrate are used in Example 1. Hereinafter, such type of a hologram is referred to as a multiple type holographic element. Except for the holographic element, the configuration of this projection type color image display apparatus is substantially the same as that of Example 1. Therefore, a detailed description of the configuration is omitted.

The recording method for the interfere fringes in the multiple type holographic element 12 is basically the same as that for the holographic elements 7 and 8 used in Example 1, except that two interfere fringes are required to be recorded on a single substrate, specifically as follows. When, for example, two interfere fringes corresponding to R and B light are to be recorded as in Example 1, the interfere fringe corresponding to beams of one color (either R or B beams) is first recorded, and the interfere fringe corresponding to beams of the other color is recorded thereafter. Therefore, it is necessary to make the light amount in one exposure a half of that adopted in recording only one interfere fringe.

The holographic element 12, which is manufactured as described above by using the same photosensitive material and laser as those used in Example 1 so as to record the two interfere fringes corresponding to R and B beams, exhibits the same effect attained by the holographic elements 7 and 8 of Example 1.

In Examples 1 and 2, a holographic element is manufactured by writing the interfere fringe as a difference in the refractive index using a photosensitive material. A holographic element, however, can be manufactured by any other method, for example, by blazed grating or a grating technique using a UV polymerizable resin or a transparent plastic.

In Example 1, two holographic elements each of which includes a hologram having selectivity against a specific wavelength band are used. In Example 2, one holographic element which includes two holograms having selectivity against different bands of wavelength is used. However, any other type of element that has wavelength selectivity and can be reproduced with white light can be used instead. In this case, one holographic element can adjust the exit angles of two or more light.

Also in Examples 1 and 2, white light is separated into three primary color beams by means of dichroic mirrors. However, it is possible to apply the invention to separation into four or more color beams. Such separation makes the invention applicable to, for example, graphic display.

As is described in Examples 1 and 2, a projection lens with a small aperture can be used in the present invention. This enables a projection type color image display apparatus to have a small size and weight, and also decreases the production cost thereof. In addition, since two holographic elements each having a hologram or a single holographic element having two holograms are used to make parallel the respective color beams which have passed through the liquid crystal display element, it is possible to provide a color image at a high light utilization ratio with satisfactory white balance.

Furthermore, in Examples 1 and 2, the dichroic mirrors 4R, 4G and 4B and the microlens array 5 are used as means for separating the light from the light source into beams of a plurality of colors and converging the color beams onto the apertures of the pixels of the liquid crystal display element 6. However, the present invention is not limited to this means, and the dichromic mirrors can be replaced with a holographic element for the color separation and the convergence of the beams onto the apertures of the pixels, such as one disclosed in Japanese Laid-Open Patent Publication No. 6-222361.

(EXAMPLE 3)

Now, a third example of the projection type color image display apparatus of the invention will be described.

Figure 8:
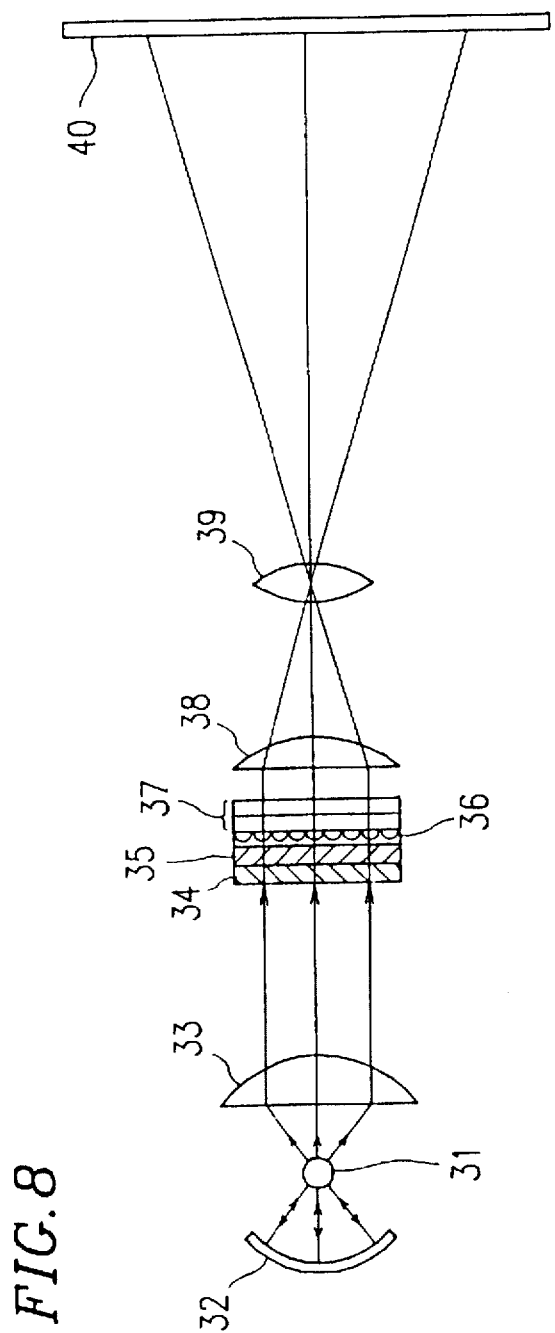
FIG. 8 is a schematic diagram showing the configuration a third example of the projection type color image display apparatus of the invention.

FIG. 8 is a schematic diagram showing the configuration of a color image display apparatus of Example 3. The present color image display apparatus comprises a white light source 31 used in a combination with a spherical mirror 32, a condenser lens 33, holographic elements 34 and 35 for B and G beams, respectively, a liquid crystal display element 37 having a microlens array 36, a projection optical system including a field lens 38 and a projection lens 39, and a projection screen 40. Each of the holographic elements 34 and 35 includes a substrate having a hologram for the corresponding color beams formed thereon.

As the white light source 31, a metal halide lamp of 150 W having an arc length of 5 mm is herein used. Other light sources such as a halogen lamp and a xenon lamp are also applicable. The spherical mirror 32 is disposed behind the light source 31, in front of which is disposed the condenser lens 33 having an aperture of 80 mmθ and a focal length $f_c$ of 60 mm.

The spherical mirror 32 is positioned so that the center thereof corresponds to the center of a light emitting portion of the light source 31. The condenser lens 33 is positioned so that the focal point thereof corresponds to the center of the light emitting portion of the light source 31. Beams exiting from the condenser lens 33 are substantially collimated. The condenser lens 33 is not the only means for obtaining collimated beams from the light source 31, but a paraboloid mirror or a combination of a spheroid mirror and an integrator can be appropriately used.

In order to suppress the temperature increase at the liquid crystal display element 37, a UV-IR cut filter (not shown in FIG. 8) for cutting off ultraviolet radiation (UV) and infrared radiation (IR), which are not necessary for color display, can be interposed between the condenser lens 33 and the liquid crystal display element 37 of FIG. 8.

Figure 9:
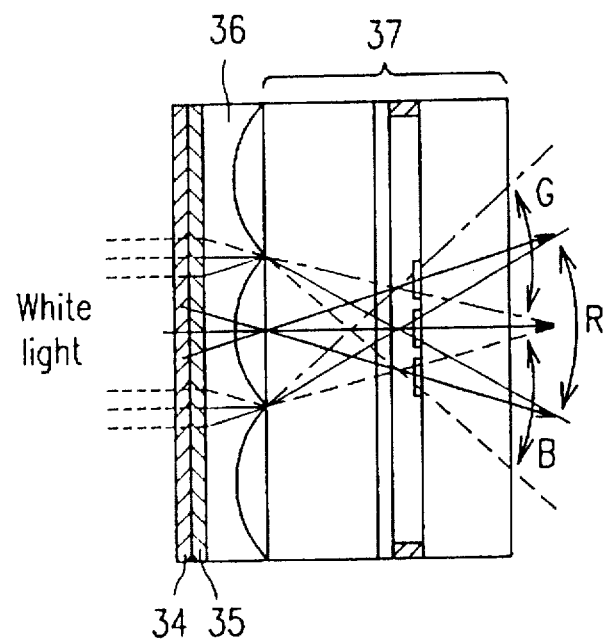
FIG. 9 is a sectional view of the main part of a liquid crystal display element used in the projection type color image display apparatus of FIG. 8.

FIG. 9 is a schematic sectional view of a portion around the liquid crystal display element 37 used in this example, wherein components of the liquid crystal display element 37 such as a polarizing plate and an alignment film are omitted for simplification.

On the incident side, i.e., the surface facing the condenser lens 33, of the liquid crystal display element 37 are adhered the holographic element 34, the holographic element 35 and the microlens array 36 in this order from the far side. The white beams which are substantially collimated by passing through the condenser 33 enter the holographic elements 34 and 35 perpendicularly thereto. The holographic element 34 diffracts the B beams alone and the holographic element 35 diffracts the G beams alone. The R beams which are not diffracted simply pass through the holographic elements 34 and 35. By appropriately selecting the diffraction angles of the B and G beams by the holographic elements 34 and 35, the B and G beams in the incident while light are allowed to exit at an angle θ against the R beam so as to be symmetrical about the R beams as is shown in FIG. 8. The relative angle θ is expressed by using a pitch P of pixels of the liquid crystal display elements 37 described below and a focal length fµ of microlenses of the microlens array 36 as follows:

$$\theta = \tan^{-1}(P/f\mu) \quad (2)$$

The holographic elements 34 and 35 are manufactured in the same manner as described in Example 1. In this example, the R, G and B beams are arranged so that the R beams are positioned at the center of these three color beams. This is because a metal halide lamp is used as the light source 31 in this example. In the spectrum of the metal halide lamp, the R component is the weakest. However, the arrangement in which the R beams are positioned at the center of the color beams eliminates an eclipse in the R beams, even when the projection lens 39 has a small aperture for decreasing the cost. Therefore, white balance is not likely to be degraded.

Figure 23A:
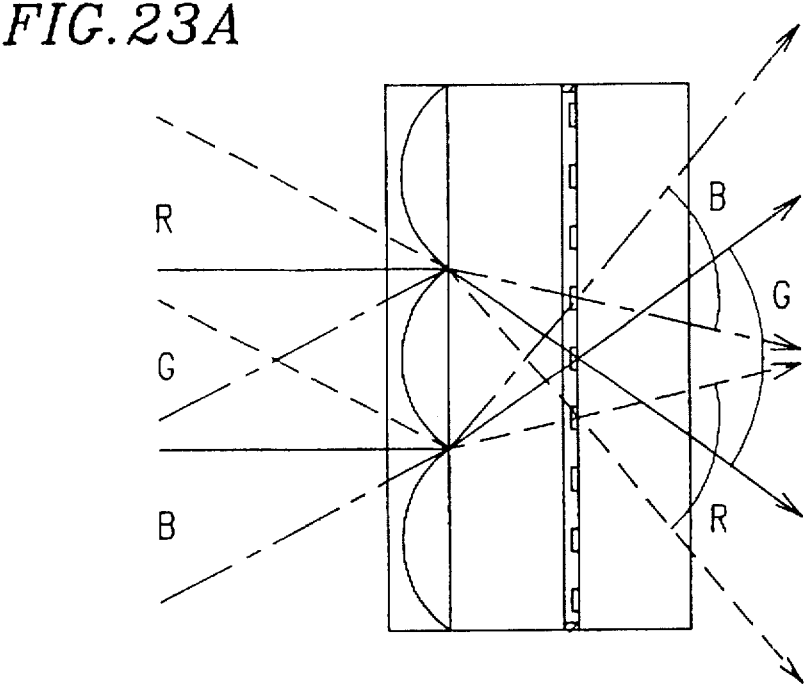
FIG. 23A illustrates the optical path of beams having passed through a liquid crystal display element in the conventional projection type color image display apparatus of FIG. 22.
Figure 23B:
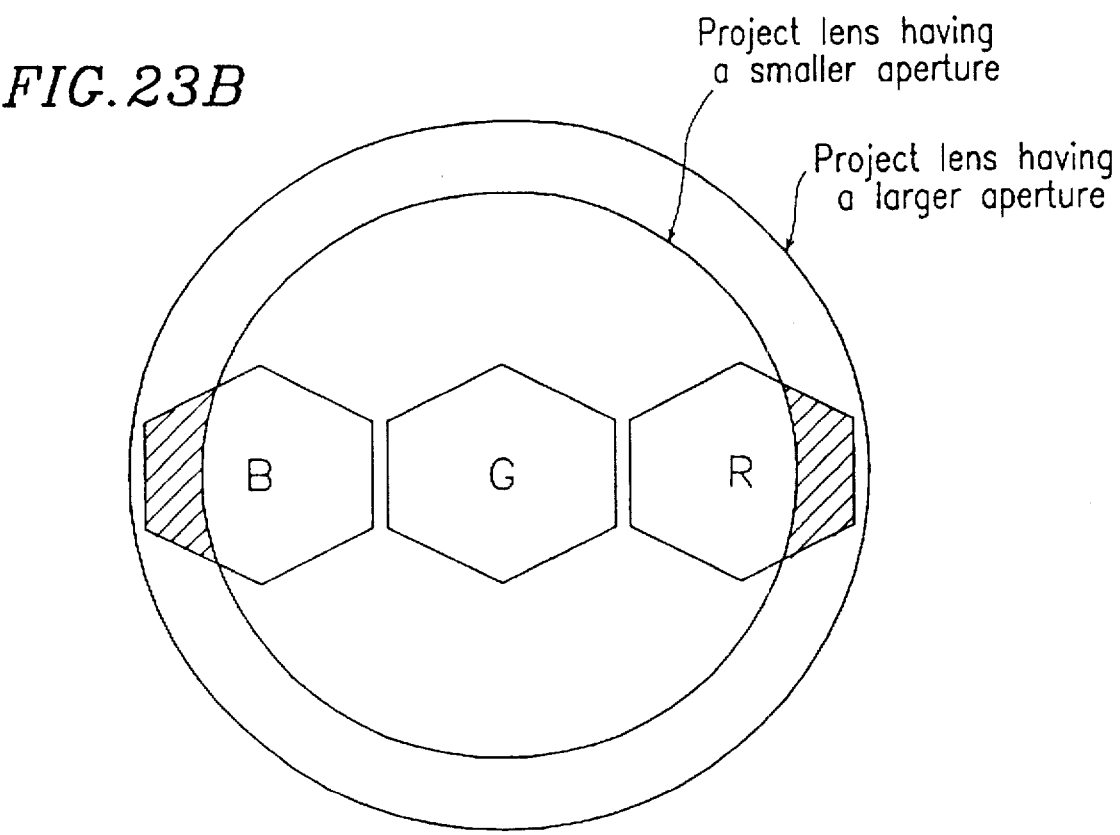
FIG. 23B shows eclipses caused at pupil positions of a projection lens in a conventional projection type color image display apparatus of FIG. 22.
Figure 24:
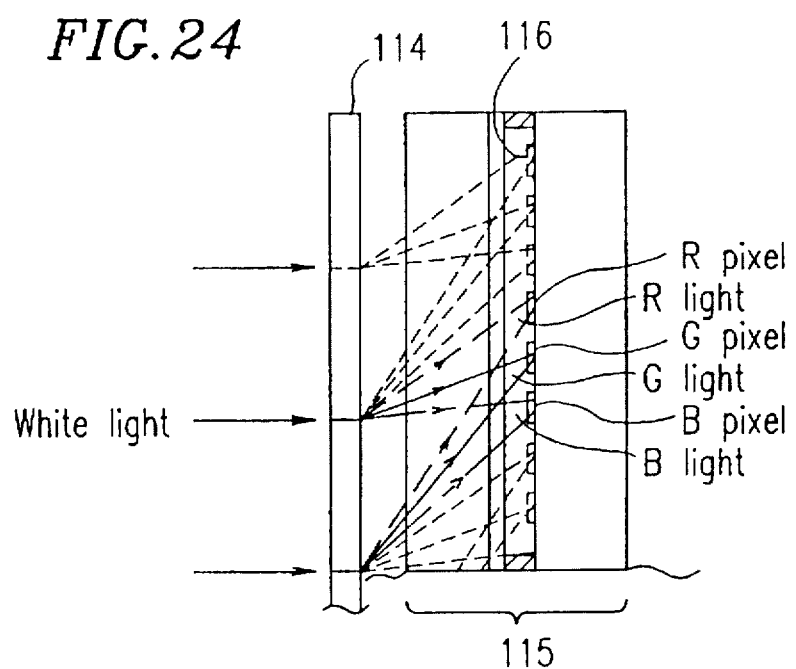
FIG. 24 is a diagram showing the main part of another configuration of a conventional projection type color image display apparatus.
Figure 25:
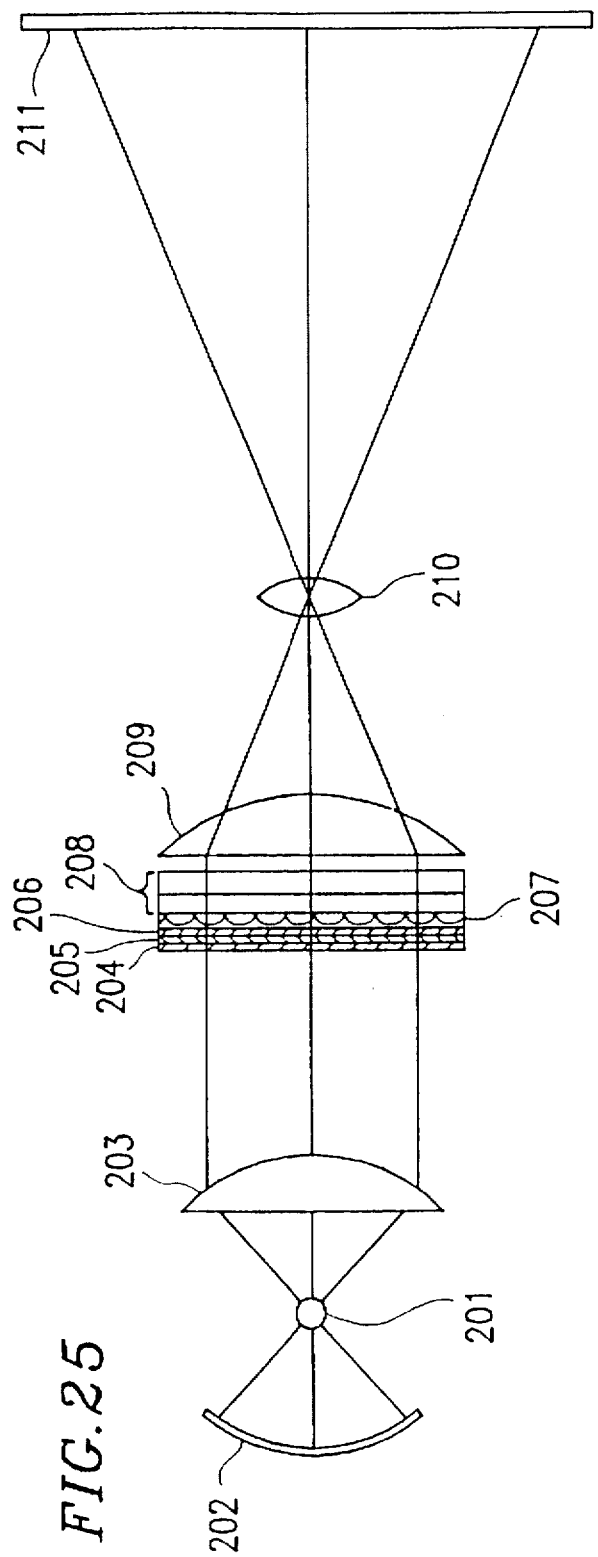
FIG. 25 is a schematic diagram showing still another configuration of the conventional projection type color image display apparatus.

In FIG. 23B, the R, G and B beams are shown so that the G beams are positioned at the center of the three color beams. When a halogen lamp having a weak B component is used as the light source 31, holographic elements for diffracting the R and G beams excluding the B beams are used as the holographic elements 34 and 35. In this case, the correspondence of the microlenses in the microlens array 36 and the pixels of the liquid crystal display element 37 are appropriately changed so that the R, G and B beams can be converged on the pixels for the corresponding colors in the liquid crystal display element. 37. When the light source has a uniform emission spectrum and the projection lens 39 has a large aperture so that there is no need to pay attention to an eclipse, the colors of the beams diffracted by the holographic elements 34 and 35 are not limited to those shown in FIG. 9,but can be optionally selected.

Figure 11:
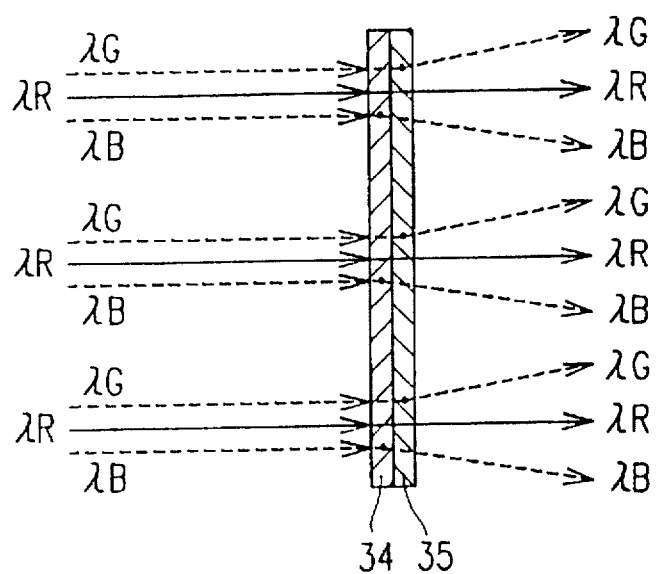
FIG. 11 is a diagram showing a portion around holographic elements of the projection type color image display apparatus Of FIG. 8.

FIG. 11 shows the optical path of the beams through the holographic elements 34 and 35 of FIG. 8. In this example, the color beams are converged on the corresponding pixels of the liquid crystal display element 37 by the microlens array 36 disposed behind the holographic elements 34 and 35. Therefore, the holographic elements 34 and 35 can have constant diffraction conditions on their faces, and are not required to have a periodic structure. In fabrication of each holographic element, the number of recording process of the interfere fringe is only one.

Owing to the function of the holographic elements 34 and 35, the R, G and B beams enter the microlens array 36 disposed on the exit side of the holographic elements 34 and 35 at different angles. In FIG. 8, the R beams enter the microlens array 36 perpendicularly thereto.

The microlens array 36 is disposed so that one microlens corresponds to a group of three pixels respectively for R, G and B of the liquid crystal display element 37. The microlens array 36 has a focal length fµ of 720 µm (corresponding to 1.1 mm, that is, the thickness of a counter substrate, within the glass medium), and is adhered to the liquid crystal display element 37 with an optical adhesive agent.

Figure 10:
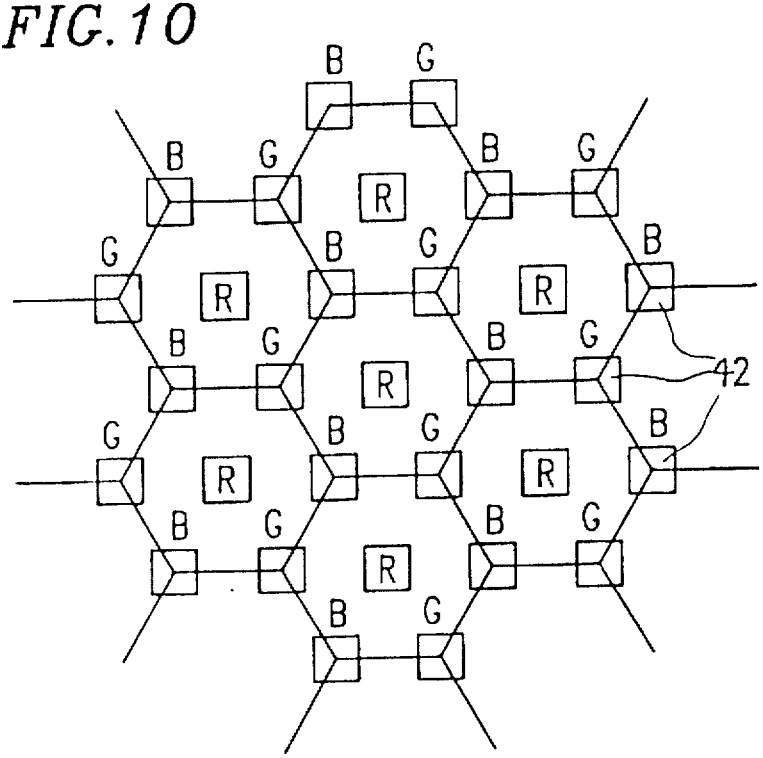
FIG. 10 is a schematic front view of a microlens array and pixel arrangement in the liquid crystal display element used in the projection type color image display,apparatus of FIG. 8.

The liquid crystal display element 37 used in this example is an active matrix type liquid crystal display element of a twisted nematic (TN) mode which is dynamically driven through semiconductor thin film transistors for switching rectangular pixels 42 arranged in the form of a delta arrangement matrix shown in FIG. 10. The vertical and horizontal pitch between the adjacent pixels is 100 µm. the apertures Size of a pixel is 50 µm in length by 70 µm in width, and the number of the pixels is 480 in vertical rows by 640 in horizontal columns.

Since the focal length fµ of the microlens array 36 is 720 µm and the pitch P of pixels of the liquid crystal display element 37 is 100 µm as described above the diffraction angle θ for the R beams by the holographic element is calculated based on Formula (2) as follows: $\theta = \tan^{-1}(100/720) = 8°$. Accordingly, the R beams enters the liquid crystal display element 37 perpendicularly thereto, and the G and B beam s enter the liquid crystal display element 37 at angles of ±8° with respect to the R beams, respectively. As a result, the convergence spots of the respective color beams by the microlens array 36 accord with corresponding pixels of the liquid crystal display element 37.

The liquid crystal display element 37 modulates incident light in accordance with a driving signal based on a received image signal. The light having been modulated by and having passed through the liquid crystal display element 37 is effectively guided by the field lens 38 to the projection lens 39, which enlarges a color image formed by the liquid crystal display element 37 and projects the enlarged image on the projection screen 40.

In a case of using a projection lens having a smaller aperture as shown by a smaller circle in FIG. 23B in the above-mentioned configuration, in the outside two color beams among the three color beams, i.e., in the B and G beams, eclipses are generated. However, no eclipse is generated in the R beams. Accordingly, en image with an excellent white balance is obtained.

In the adhesion of the microlens array 36 to the incident side of the liquid crystal display element 37, it is necessary to positionally align the microlenses of the microlens array 36 with the pixels of the liquid crystal display element 37 with high precision, as in a conventional apparatus. However, the holographic elements 34 and 35 of this example has no periodic structure, and hence, there is no need to perform a high-precision positional alignment of the holographic element with the microlens array 36 and the liquid crystal display element 37. This also applies to Example 4 below.

Furthermore, when the holographic elements 34 and 35 are disposed at a very small distance from the microlens array 36 and the liquid crystal display element 37, a difference in the illuminance distribution of the R, G and B beams on the liquid crystal display element 37 can be ignored. In this example, the holographic elements 34 and 35 are adhered to the microlens array 36, so as to minimize the difference in the illuminance distribution, thereby improving the white balance of a projected image. This also applies to Example 4.

The microlens array 36 can be manufactured by any of the following methods: an ion exchange method (Appl. Opt. Vol. 21, p. 1052 (1984) or Electron. Lett. Vol. 17, p. 452 (1981); a swelling method (Suzuki, et al., "Novel production method for a plastic microlens", the 24th Society for Micro-optics); a thermal sagging method (Zoran D. Popovic, et al., "Technique for monolithic fabrication of microlens arrays", Appl. Opt. Vol. 27, p. 1281 (1988); deposition (Japanese Laid-Open Patent Publication No. 55-135808); thermal transfer (Japanese Laid-Open Patent Publication No. 61-64158); mechanical processing; and a method disclosed in Japanese Laid-Open Patent Publication No. 3-248125.

In this example, on one surface of the microlens array 36 is adhered the liquid crystal display element 37 and on the other surface thereof is adhered the holographic elements 34 and 35. Therefore, the microlens array 36 preferably has flat optical surfaces in view of mechanical strength.

Accordingly, the microlens array used in this example is fabricated by the ion exchange method for forming refractive index distribution type microlenses between glass plates. It is noted that the production method for the microlens array is not limited to the ion exchange method. Even when a method for forming microlenses in a physical shape on a flat substrate, such as the thermal sagging method, is adopted, it is possible to produce a microlens array suitable to this example without spoiling the converging function and mechanical strength after adhesion, through an additional procedure for providing a leveling layer or a covering glass so as to flatten a concave and convex surface formed by the shape of the microlenses. This also applies to Example 4.

(EXAMPLE 4)

Figure 12:
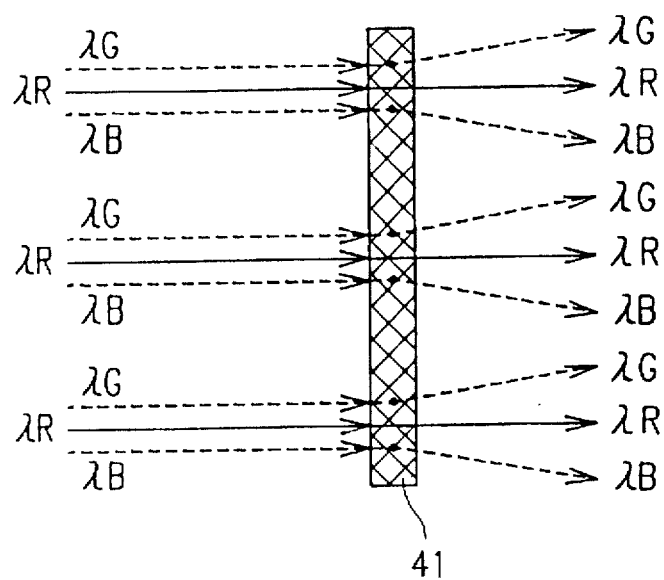
FIG. 12 is a diagram showing a portion around a multiple type holographic element used in a fourth example of the projection type color image display apparatus of the invention.

FIG. 12 is a diagram showing a portion around a multiple type holographic element used in a projection type color image display apparatus of this example.

The basic configuration of the present projection type color image display apparatus is substantially the same as that of Example 3, except that the holographic elements 34 and 35 of Example 3 are replaced with a multiple type holographic element 41 in which two interfere fringes are both recorded on one hologram.

The recording method for the interfere fringes in the multiple type holographic element 41 is basically the same as that for the holographic elements used in Example 3, except that a plurality of interfere fringes are required to be recorded on one hologram, specifically as follows. When, for example, two interfere fringes corresponding to the G and B beams are to be recorded as in Example 3, the interfere fringe corresponding to beams of one color (either G or B beams) is first recorded, and the interfere fringe corresponding to beams of the other color is recorded thereafter. Therefore, it is necessary to make the amount of light in each exposure a half of that adopted in recording only one interfere fringe.

The multiple type holographic element 41, which is manufactured as described above by using the same photosensitive material and laser as those used in Example 3 so as to record the two interfere fringes corresponding to the G and B beams, exhibits the same effect attained by the holographic elements 34 and 35 of Example 3.

In Examples 3 and 4, a holographic element is manufactured by using a photosensitive material and writing at least one interfere fringe of light as a difference in the refractive index. A holographic element, however, can be manufactured by any other method, for example, by blazed grating or a grating technique using a UV polymerizable resin or a transparent plastic.

Also in Examples 3 and 4, two holographic elements each having selectivity against one wavelength or one multiple type holographic element are used. However, any other type of element that has wavelength selectivity and can be reproduced with white light can be used instead. In this case, one holographic element can adjust the exit angles of two or more light beams.

Furthermore, in the present invention, it is possible to adopt three holographic elements respectively corresponding to the R, G and B beams or one multiple type holographic element to improve color purity.

In addition, the present color image display apparatus can further comprise another holographic element which does not allow unnecessary light other than the R, G and B beams, which can decrease color purity, to enter the pixels, for example, a holographic element having a property to reflect the unnecessary light through diffractions.

After originals of the holographic elements 34, 35 and 41 used in the aforementioned examples are produced in the aforementioned manner, optical elements having the equivalent diffraction effect can be mass-produced at a low cost by a known copying technique. This results in a lower cost than that of a conventional apparatus adopting the dichroic mirrors as the color separation means. Additionally, such a holographic element can minimize the length of the optical path from the color separation means to the liquid crystal display element, thereby minimizing the entire size of the projection type color image display apparatus.

Figure 13A:
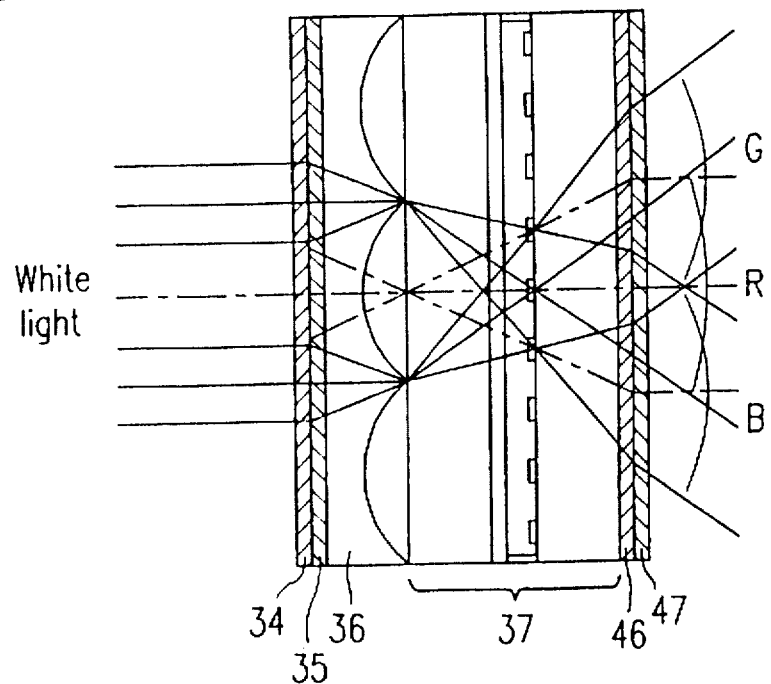
FIG. 13A is a detailed (sectional) view of the main part of a liquid crystal display element used in a modification of the projection type color image display apparatus of the invention.
Figure 13B:
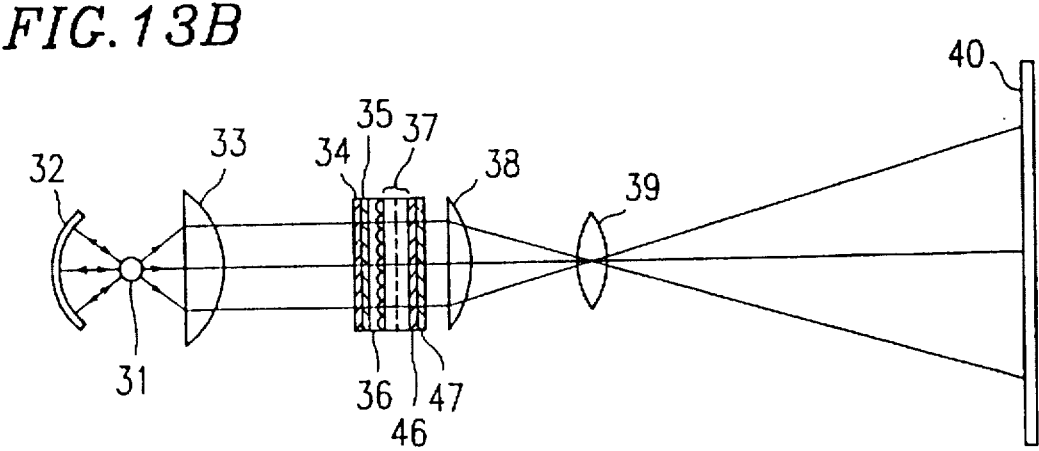
FIG. 13B is a schematic diagram showing the configuration of the modification of the projection type color image display apparatus of the invention.

Furthermore, the color image display apparatuses of Examples 3 and 4 can be further provided with additional holographic elements having wavelength selectivity disposed on the side of the liquid crystal display element 37 facing the field lens 38, for respectively diffracting the R, G and B beams so as to make the principal rays thereof parallel to one another. Such holographic elements prevent the converging positions on the incident pupil of the projection lens 39 from fluctuating depending upon the colors. As a result, the aperture of the projection lens can be minimized, thereby further decreasing the cost. The same type of holographic element as the holographic elements 34, 35 and 41 can be used for this purpose. FIG. 13A is a diagram showing the configuration and the optical path around the liquid crystal display element 37 in adopting such additional holographic elements, and FIG. 13B is a schematic diagram of the entire configuration of the color image display apparatus in such a case. When the initially used holographic elements diffract the B and G beams, respectively, as in Example 3, additional holographic elements 46 and 47 disposed on the side of the liquid crystal display element 37 facing the field lens 38 also diffract the B and G beams, so as to make the principal rays of the B and G beams parallel to that of the R beams.

As described above, in Examples 3 and 4, each of the holographic elements is designed so that color beams of a weak emission spectrum enter the display surface of the liquid crystal display element at an angle close to 90°. This enables the projection lens having a small aperture to be used without damaging white balance, resulting in reduction of the production cost of the projection type color image display apparatus. In addition, there is no need to bend the optical path by reflecting the white light emitted by the light source, unlike the case where dichroic mirrors are utilized, but the holographic elements can be disposed perpendicularly to the optical axis of the white light. This enables the holographic elements to be overlaid on the microlens array and the like, and hence, the length of the optical path from the light source to the liquid crystal display element can be minimized. As a result, the projection type color image display apparatus can attain a smaller size and weight and a lower production cost.

Furthermore, the holographic element having wavelength selectivity can be mass-produced at a low cost by producing and copying an original thereof. This also results in a lower cost as compared with an apparatus using the dichroic mirrors. In addition, since the holographic elements are provided in front of the microlens array, there is no need to provide a periodic structure to the holographic element themselves. Therefore, the holographic element is not required to be accurately positioned with regard to the liquid crystal display element as compared with the positional alignment of the microlens array with the liquid crystal display element. This makes the production of the holographic element easier. When the holographic elements corresponding to the respective color beams are replaced with one multiple type holographic element, the number of the components can be reduced and the production cost can be further decreased.

(EXAMPLE 5)

Example 5 of the projection type color image display apparatus of the invention will now be described referring to FIG. 14. In this example, unlike Examples 3 and 4, the substantially collimated white beams are allowed to obliquely enter a holographic element in order to prevent degradation of the color purity of a displayed image, which is caused when a holographic element having wavelength selectivity is used as means for separating color beams from white beams.

Figure 14:
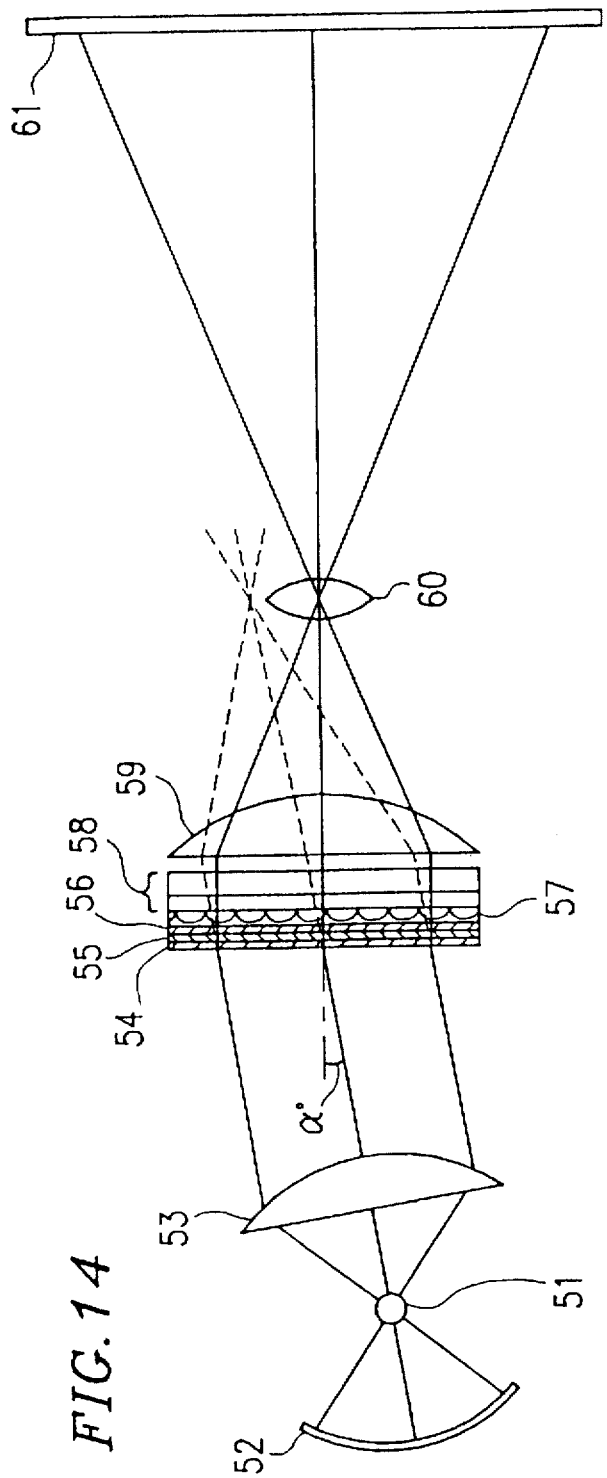
FIG. 14 is a schematic diagram showing the configuration of a fifth example of the projection type color image display apparatus of the invention.

As is shown in FIG. 14, a spherical mirror 52 and a condenser lens 53 are disposed behind and in front of a white light source 51, respectively. The white light source 51, the spherical mirror 52 and the condenser lens 53 are positioned with reference to one another so that the center of the spherical mirror 52 and the focal point of the condenser lens 53 correspond to the center of a light emitting portion of the white light source 51. Beams having passed through the condenser lens 53 are substantially collimated.

Any of a metal halide lamp, a halogen lamp and a xenon lamp can be used as the white light source 51. In this example, a metal halide lamp of 150 W having an arc length of 5 mm is used as the white light source 51. The condenser lens 53 used in this example has an aperture of 80 mmθ and a focal length $f_c$ of 60 mm. The method for obtaining collimated beams from the white light source is not limited to the condenser lens but a paraboloid mirror or a combination of a spheroid mirror and an integrator can be appropriately used.

Figure 15:
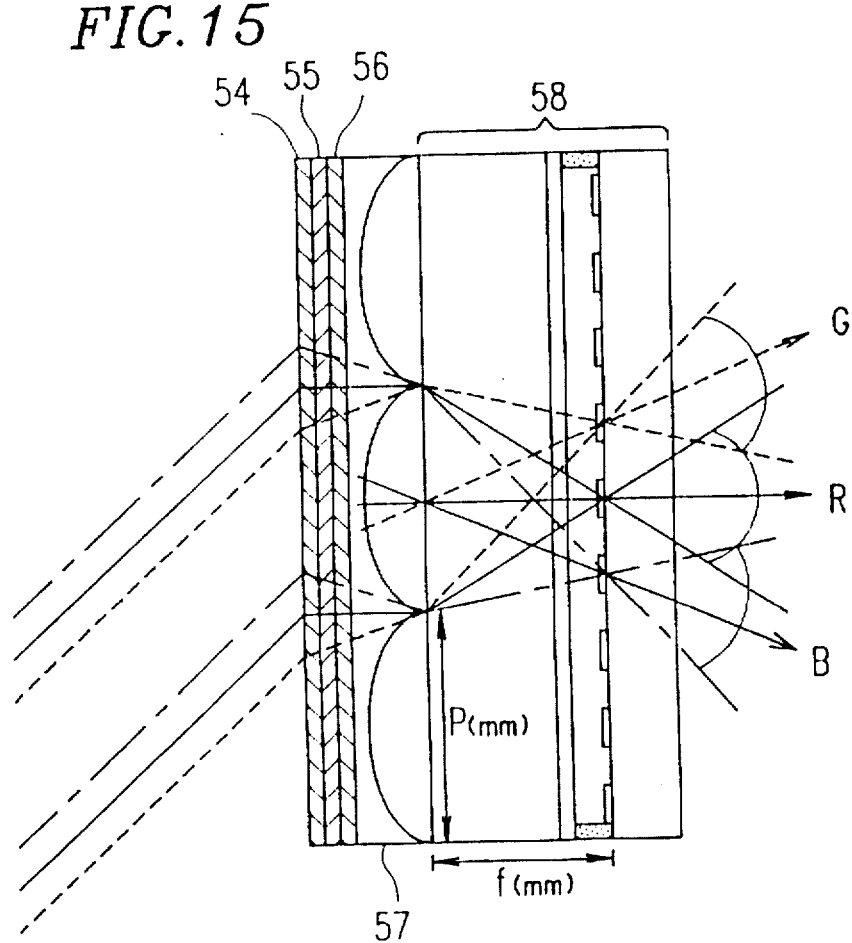
FIG. 15 is a sectional view of the main part of a liquid crystal display element used in the projection type color image display apparatus of FIG. 14.

FIG. 15 is a schematic sectional view of a portion around a liquid crystal display element 58 used in this example. The components of the liquid crystal display element such as a polarizing plate and an alignment film are omitted for simplification. As is shown in FIG. 15, on the incident side of the liquid crystal display element 58, i.e., on the surface facing the condenser lens 53, are adhered holographic elements 54, 55 and 56 and a microlens array 57 in this order from the far side.

The substantially collimated white beams having passed through the condenser lens 53 enter the holographic elements 54, 55 and 56 at an angle α° with respect to the normal of the surfaces thereof bearing gratings. The holographic element 54 selectively diffracts the beams in them wavelength range of blue light, i.e., the B beams; the holographic element 55 selectively diffracts the beams in the wavelength range of red light, i.e., the R beams; and the holographic element 56 selectively diffracts the beams in the wavelength range of green light, i.e., the G beams. The diffraction angles of the holographic elements 54, 55 and 56 are set to have a difference of an angle θ° from the diffraction angle of the adjacent element, so that the exit direction of the diffracted G beams and that of the diffracted B beams are symmetrical about that of the diffracted R beams as shown in FIG. 15. In this example, it is unnecessary to arrange the beams of color having a weak emission spectrum of the white light source to be positioned at the center of the three color beams, unlike Examples 3 and 4. The angle θ° is determined so that the respective color beams irradiate merely the apertures of the corresponding pixels and do not irradiate the apertures of the pixels for the other colors. However, a certain percentage of each of the B beams, the R beams and the G beams is not diffracted by the holographic elements 54, 55 and 56 as is shown with broken lines in FIG. 14 and enters the liquid crystal display element as zero-order diffracted light. This zero-order diffracted light degrades the color purity of a displayed image. Therefore, in this example, the angle α° at which the white beams enter the holographic elements 54, 55 and 56 is determined so that the zero-order diffracted light of the respective holographic elements is not allowed to enter a projection lens. 60.

Figure 18:
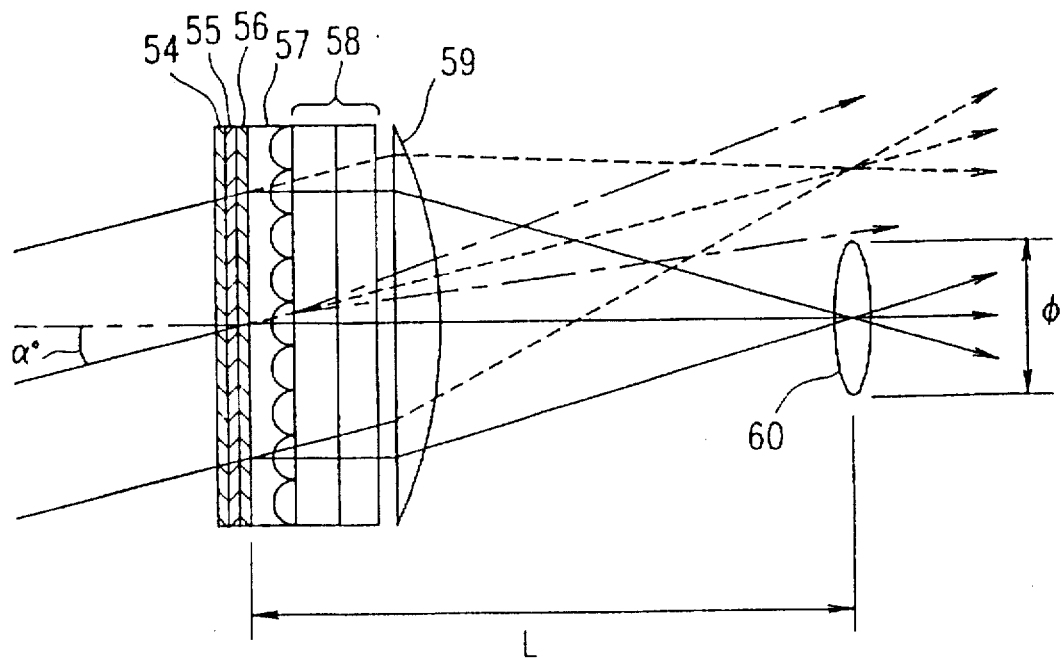
FIG. 18 illustrates the operation of the projection type color image display apparatus of FIG. 14.

Specifically, when the distance between the holographic elements 54, 55 and 56 and the projection lens 60 is indicated as L (mm), the effective aperture of the projection lens 60 is indicated as φ (mm), the focal length in air of each microlens of the microlens array 57 is indicated as f (mm) and the pitch between the adjacent microlenses is indicated as p (mm), as is shown in FIG. 18 and 15, the incident angle α° against the hologram elements 54, 55 and 56 is determined so as to satisfy the following formula (3):

$$\alpha° > \tan^{-1}(\phi/2L) + \tan^{-1}(p/2f) \quad (3)$$

Also, when the pitch between the adjacent pixels of the liquid crystal display element 58 is indicated as p' (mm), the difference θ° in the diffraction angle is determined so as to satisfy the following formula (4):

$$\theta = \tan^{-1}(p'/f) \quad (4)$$

Figure 16:
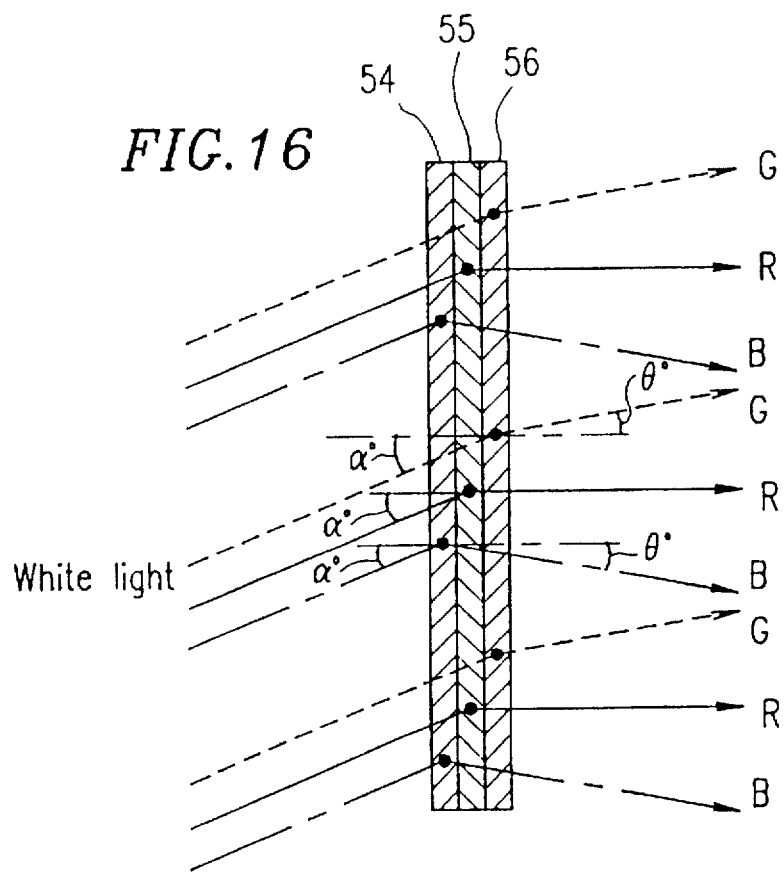
FIG. 16 is a diagram showing a portion around holographic elements used in the projection type color image display apparatus of FIG. 14.

FIG. 16 shows the optical path around the holographic elements 54, 55 and 56. In this example, the holographic element 54 for the B beams, the holographic element 55 for the R beams and the holographic element 56 for the G beams are respectively manufactured so as to have the incident angles α° satisfy Formula (3).

Figure 17:
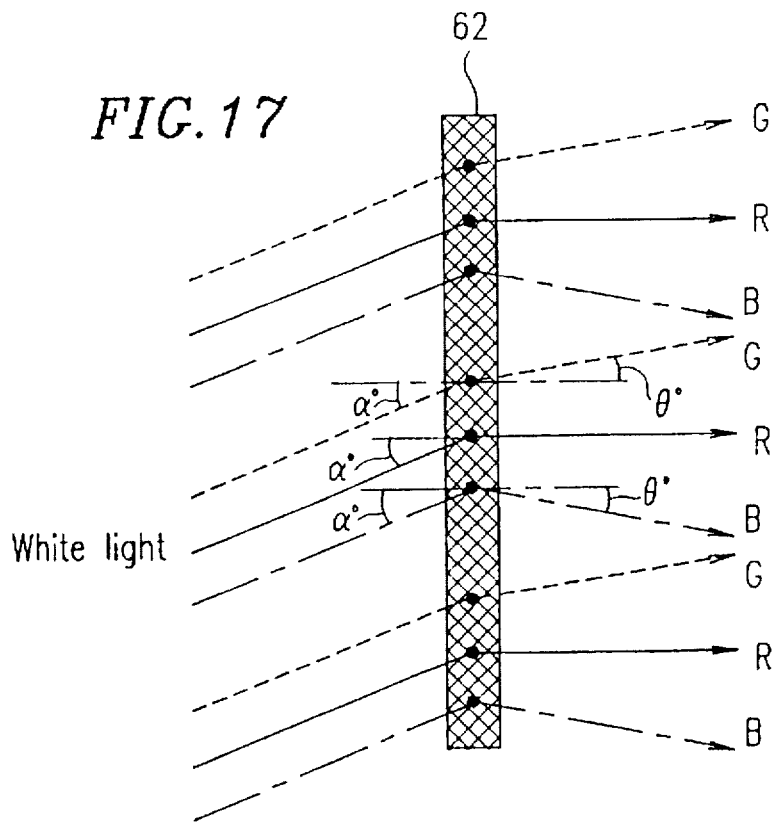
FIG. 17 is a diagram showing a portion around a multiple type holographic element applicable to the projection type color image display apparatus of FIG. 14.

Alternatively, the three holographic elements 54, 55 and 56 can be replaced with a multiple type holographic element in which three interfere fringes corresponding to the R, G and B beams, respectively, are recorded on one hologram. FIG. 17 shows the optical path around such a multiple type holographic element 62 applied to this example.

The multiple type holographic element 62 can be manufactured basically in the same manner as the holographic elements 54, 55 and 56 except that a plurality of interfere fringes are recorded on one hologram. Specifically when, for example, three interfere fringes corresponding to the R, G and B beams are to be recorded as in this example, an interfere fringe corresponding to beams of one color of the above three color beams is first written, and the remaining interfere fringes corresponding to the other color beams are successively written thereafter. Therefore, the amount of light exposure for recording each interfere fringe is required to be as small as approximately one-third of that adopted when merely one interfere fringe is to be written.

The multiple type holographic element 62, which is manufactured by using the same photosensitive material and laser as those used for the production of the holographic elements 54, 55 and 56 so as to record the three interfere fringes corresponding to the R, G and n beams, exhibits the same effect attained by the three holographic elements 54, 55 and 56 shown in FIG. 16.

In this example, a holographic element is manufactured by using a photosensitive material and writing the interfere fringe of light as a difference in the refractive index. A holographic element, however, can be manufactured by any other method, for example, by blazed grating or a grating technique using a W polymerizable resin or a transparent plastic.

Also in this example, three holographic elements each for selectively diffracting light in a wavelength range of one color of light or one multiple type holographic element are used. However, any other type of element that has wavelength selectivity and can be reproduced with white light can be used instead. In this case one holographic element can adjust the exit angles of three or more light beams.

After originals of the holographic elements 54, 55 and 56 or the multiple type holographic element 62 used in this example are produced in the aforementioned manner, optical elements having the equivalent diffraction effect can be mass-produced at a low cost by a known copying technique.

This results in a lower cost than that of a conventional apparatus adopting the dichroic mirrors as the color separation means. Additionally, such a holographic element can minimize the length of the optical path from the color separation means to the liquid crystal display element, thereby minimizing the entire size of the projection type color image display apparatus.

Now, an optical system including the three holographic elements 54, 55 and 56 will be described.

FIG. 16 shows the optical path around the holographic elements 54, 55 and 56 of FIG. 14. In this example, the respective color beams are converged on the corresponding pixels of the liquid crystal display element 58 by means of the microlens array 57 disposed behind the holographic elements 54, 55 and 56. Therefore, the diffraction condition of each of the holographic elements 54, 55 and 56 is constant on its face and there is no need to provide a periodic structure to each holographic element. The interfere fringe can be recorded on each hologram element at one time.

Owing to the function of the holographic elements 54, 55 and 56, the R, G and B beams enter the microlens array 57 at different angles. The microlens array 57 is adhered to a counter substrate of the liquid crystal display element 58 by means of an optical adhesive agent. Each microlens of the microlens array 57 corresponds to a group of three pixels of the liquid crystal display element 58, one pixel corresponding to R light, another pixel corresponding to G light and the other pixel corresponding to B light. These three pixels are irradiated with the R, G and B beams through the counter substrate of the liquid crystal display element 58. Each microlens is designed so as to have a focal length f substantially equal to the thickness of the counter substrate within the material for the counter substrate. In this example, a glass substrate with a thickness of 1.1 mm is used as the counter substrate, and the focal length f of each microlens is 0.72 mm in air (corresponding to 1.1 mm within the glass medium).

The liquid crystal display element 58 used in this example is an active matrix type liquid crystal display element of a twisted nematic (TN) mode which is dynamically driven through semiconductor thin film transistors for switching a plurality of pixels. In this example, the rectangular pixels 42 are arranged in the form of a delta arrangement matrix as shown in FIG. 10. The vertical and horizontal pitch p' of the pixels is 0.1 mm (therefore, the pitch p of the microlenses is 0.3 mm), the aperture size of a pixel is 0.5 mm in length by 0.7 mm in width, and the number of the pixels is 480 in vertical rows by 640 in horizontal columns. Accordingly, the difference θ° between the diffraction angles of the holographic elements 54 and 55 and between the diffraction angles of the holographic is elements 55 and 56 is calculated based on Formula (4) as follows: θ=tan$^{-1}$(0.1/0.72)=8°. Therefore, the G and B beams enter the liquid crystal display element 58 at angles of ±8° against the R beams, respectively. In this example, the R beams enter the liquid crystal display element 58 perpendicularly thereto. In this manner, the R, G and B beams are converged on the different pixel by the microlens array 57.

A driving circuit (not shown) for the liquid crystal display elements 58 generates a driving signal based on an externally input image signal and supplies the driving signal to each pixel in an independent manner, thereby driving the pixels of the liquid crystal display element 58. The color beams having entered the pixels under application of the driving signal are optically modulated, thereby forming a color image. The beams having passed through the liquid crystal display element 58 are effectively guided toward the projection lens 60 by a field lens 59. The projection lens 60 enlarges a color image displayed on the liquid crystal display element 58 and projects the enlarged color image on a screen 61.

In this example, the projection lens 60 shown in FIG. 18 has an effective aperture $\phi$ of 50 mm, and the field lens 59 is designed so that a distance L between the holographic element and the principal plane of the projection lens 60 is 140 mm. Therefore, based on Formula (3), it is when the incident angle $\alpha°$ is $\tan^{-1}(50/2\times140)+\tan^{-1}(0.3/2\times0.72)=21.9°$ or more that any of the zero order diffracted light of the holographic elements 54, 55 and 56 does not enter the projection lens 60. Accordingly, the holographic elements 54, 55 and 56 of this example are manufactured so that the white light enters these holographic elements at an angle of 22° with respect to the normal thereof. When the holographic elements are thus designed so as to allow white light to enter the holographic elements at an angle satisfying Formula (3) with respect to the normal thereof, light not having been diffracted by the holographic elements 54, 55 and 56, that is, zero-order diffracted light of these holographic elements, is not converged on the projection lens 60 by the field lens 59. As a result, the zero-order diffracted light does not harmfully affect the image quality without causing color dislocation and the like.

In adhering the microlens array 57 to the incident side of the liquid crystal display element 58, it is necessary to perform a positional alignment of pixels of the liquid crystal display element 58 with microlenses of the microlens array 57 with high precision, as in the conventional projection type color image display apparatus. However, since the holographic elements 54, 55 and 56 do not have a periodic structure, there is no need to precisely adjust the positions of the holographic elements 54, 55 and 56 with regard to the microlens array 57 and the liquid crystal display element 58.

Furthermore, when the holographic elements 54, 55 and 56 are disposed at a very small distance from the microlens array 57 and the liquid crystal display element 58, a difference in the illuminance distribution of the R, G and B beams, which have bean separated by the display element SB Can be substantially ignored in this example, since the holographic elements 54, 55 and 56 overlaid on the microlens array 57 are adhered to the incident side of the liquid crystal display element ES, the distance between the holographic elements 54, 55 and 56 and the liquid crystal display element 58 is minimized, so as to minimize the difference in the illuminance distribution. As a result, white balance in a projected image can be improved.

The R beams enter the microlens array 57 perpendicularly thereto and the incident directions of the G and B beams are symmetrical about that of the R beams in this example. The arrangement of the respective color beams are not limited to this. Specifically, even when the light entering the microlens array 57 perpendicularly thereto is the G or B beams, the same effect as described above can be attained.

Furthermore, the holographic elements 54, 55 and 56 can be provided with a converging function in addition to the aforementioned function to diffract light in the wavelength range of the corresponding color light. In this case, the microlens array 57 can be omitted. This also applies to the case where the three holographic elements 54, 55 and 56 are replaced with the multiple type holographic element 62.

(EXAMPLE 6)

Example 6 of the projection type color image display apparatus of the invention will now be described In this example, the incident angle and direction of the white light with respect to a holographic element is settled, so that the zero-order diffracted light of the respective color beams exiting from the holographic element is prevented from entering the projection lens 60.land so that the light utilization ratio in the liquid crystal display element 58 is maximized.

White light entering the liquid crystal display element 58 through the holographic element and the microlens array generally has a section in the shape of a circle no matter if the means for obtaining collimated beams from the white light emitted by the light source 51 is a condenser lens shown in FIG. 14, a paraboloid mirror or a combination of a spheroid mirror and an integrator. In contrast, the display portion of the liquid crystal display element 58, that is, a portion where plurality of pixels are arranged, is generally in the shape of a rectangle. Accordingly, as is shown in FIG. 19A, a large portion of the light wastefully fails to irradiate the display portion of the liquid crystal display element 58.

In this example, by allowing the white light to obliquely enter the holographic elements, so that an area of the liquid crystal display element 58 irradiated with the color beams having passed through the holographic elements has an elliptical shape. In addition, as is shown in FIG. 19B, the ellipse is allowed to have an aspect ratio in accordance with that of the liquid crystal display element 58. In this manner, the white light emitted by the light source can be more effectively utilized than in the conventional projection type color image display apparatus in which light having a circular section enters the liquid crystal display element. Moreover, since the minor axis of the elliptical section corresponds to the diameter of the light, it is possible to irradiate the display portion of the liquid crystal display element 58 with light having a smaller diameter than that of a conventional one. Furthermore, when the incident angle of the white light with respect to the holographic element is settled at an angle which does not allow zero-order diffracted light of the color beams having passed through the holographic element to enter the projection lens, i.e., an angle satisfying Formula (3), the effect of Example 5 can be simultaneously exhibited. As a result, it is possible to provide a compact projection type color image display apparatus which can project a bright image with satisfactory color purity.

Specifically, in order to accord the aspect ratio of the elliptical section of the light irradiating the liquid crystal, display element 58 with the aspect ratio of the liquid crystal display element 58, the incident angle of the white light with respect to the holographic elements 54, 55 and,56 is determined as follows.

When the incident angle of the white light with respect to the holographic elements 54, 55 and 56 is indicated as $\alpha°$ and the vertical and horizontal lengths of the display portion of the liquid crystal element 58 are indicated as "a"(mm) and "b"(mm), respectively, the area of a minimum elliptical shape which can irradiate the entire display portion is represented as follows:

$$(\pi/4)\times(a^2+b^2/(\cos \alpha°)^2) \cos \alpha°. \tag{5}$$

Accordingly, a proportion occupied by the display portion of the liquid crystal display element 58 in the ellipse, that is, the light utilization ratio is represented as follows:

$$100\times(a \cdot b)/\{(\pi/4)\cdot(a^2+b^2/(\cos \alpha°)^2) \cos \alpha°\} \tag{6}$$

The liquid ;crystal display element 58 used in this example is, similarly to Example 5, an active matrix type liquid crystal display element of a twisted nematic (TN)

mode which is dynamically driven through semiconductor thin film transistors for switching rectangular pixels 42 arranged in the form of a delta arrangement matrix. The display portion of the liquid crystal display element 58 has a size of 54.9 mm×73.2 mm. The relationships between the incident angle α° of the white light with respect to the holographic elements and the light utilization ratio is shown in FIG. 20.

Figure 20:
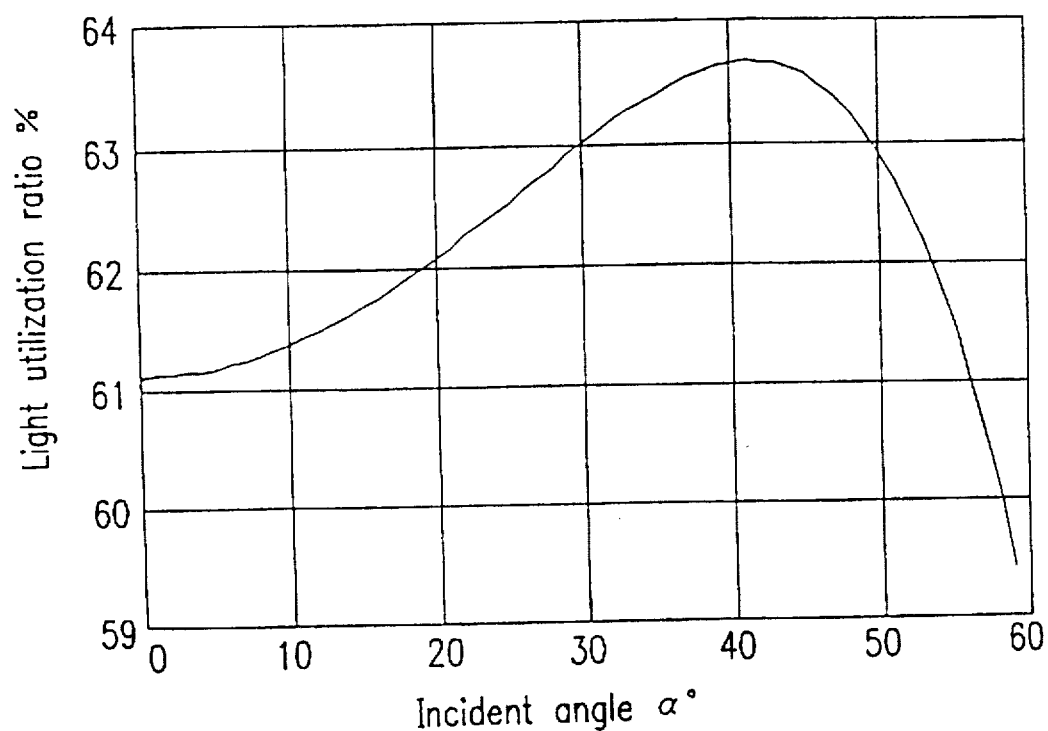
FIG. 20 shows the relationship between the incident angle of the white light irradiating the liquid crystal display element and a light utilization ratio in the sixth example of the projection type color image display apparatus of the invention.

As is understood from Formula (5) and FIG. 20, the highest light utilization ratio can be attained when $\alpha° = \cos^{-1}(a/b)$. This effect is more apparently exhibited when the display portion of the liquid crystal display element 58 has a more slender shape.

In accordance with the examination by the present inventors, more than half of the effect of the highest light utilization ratio can be attained in a general image display apparatus in the following cases:

(1) in the case where a <b, the white light is allowed to enter the holographic elements in the horizontal direction so as to satisfy the relationship $\cos^{-1}(a/b)-15° < \alpha° < \cos^{-1}(a/b)+10°$; and (2) in the case where a >b, the white light is allowed to enter the holographic elements in the vertical direction 5o as to satisfy the relationship $\cos^{-1}(b/a)-15° < \alpha° \cos^{-1}(b/a)+10°$.

In this example, "a" is 54.9 mm and "b" is 73.2 mm, and hence, the highest light utilization ratio is obtained when $\alpha° = \cos^{-1}(54.9/73.2) = 41.4°$. This angle α° also satisfies Formula (3). Therefore, in this example, the white, light is allowed to enter the holographic elements in the horizontal direction at an angle of 41.4° with respect to the normal of the holographic elements. Thus, projection type color image display apparatus having an excellent light utilization ratio, in which zero-order diffracted light of the respective color beams having passed through the holographic elements is prevented from entering the projection lens, can be realized.

Now, the sectional area of the wastefully irradiating light will be calculated in the present apparatus.

In the case where the light enters the holographic element perpendicularly thereto, since the area of the display portion of the liquid crystal display element 58 is 54.9×73.2= 4018.68 mm², the light is required to have a diameter of at least 91.5 mm. The sectional area of the light wasted in this case is 45.75×45.75×3.14−4018.68=2556.87 mm . In contrast, in the example where the white light enters the holographic element at an angle of 41.4° with respect to the normal of the holographic element, the white light is required to have a diameter of at least 77.7 mm. The sectional area of the light wasted in the present apparatus is 38.8×38.8×3.14×(73.2/54.9)−4018.68=2287.29 mm². Therefore, when the liquid crystal display element has a display portion with the aforementioned size, the proportion of the light irradiating the display portion is 61.1% in the apparatus where white light enters the holographic element perpendicularly thereto, and is 63.7% in the present apparatus In this manner, the light utilization ratio can be increased, while the zero-order diffracted light of the holographic element is prevented from entering the projection lens 60, in this example.

When the design of the condenser lens and the like is changed, the size of the white light can be changed without changing the light source itself. As a result, it is possible to design a more compact and brighter projection type color image display apparatus.

Also in this example, since the holographic elements 54, 55 and 56 do not have a periodic structure, there is no need to perform a high-precision positional alignment among the holographic elements 54, 55 and 56, the microlens array 57 and the liquid crystal display element 58. Furthermore, since the holographic elements 54, 55 and 56 overlaid on the microlens array 57 are adhered to the incident side of the liquid crystal display element 58, the distance between the holographic elements 54, 55 and 56 and the liquid crystal display element 58 is minimized, so as to minimize the difference in the illuminance distribution of the color beams. As a result, white balance in a projected image can be improved.

The R beams enter the microlens array 57 perpendicularly thereto and the incident directions of the G and beams are symmetrical about that of the R beams in this example. The arrangement of the respective color beams are not limited to this. Specifically, even when the light entering the microlens array 57 perpendicularly thereto is the G or B beams, the same effect as described above can be attained. In this example, it is unnecessary to arrange the beams of color whose emission spectrum is weakest among the R, G and B beams at the center of the PR, G and B beams., Furthermore, the holographic elements 54, 5 and 56 can be provided with a converging function in addition to the aforementioned function to diffract beams in the wavelength range of the corresponding color light. In this case, the microlens array 57 can be omitted. This also applies to the case where the three holographic elements 54, 55 and 56 are replaced with the multiple type holographic element 62.

As described above, in Examples 5 and 6, the incident angle of the white light with respect to the optical element for color separation, for example, the holographic element, is settled so that the zero-order diffracted light of the optical element is prevented from entering the lens for projecting an image displayed in the liquid crystal display element. As a result, the color purity of a projected image can be improved.

Furthermore, by setting the incident angle of the white light with respect to the optical element so that the light irradiating the display portion of the liquid crystal display element has a shape of an ellipse having an aspect ratio identical to the aspect ratio of the display portion, the light utilization ratio can be increased as compared with the case where the white light enter the optical element perpendicularly thereto.

Since the color purity of a projected image can be improved and the utilization ratio of the light emitted by the light source can be increased, it is possible to decrease the size of the light source without decreasing the brightness of the projected image. Therefore, a more compact projection type color image display apparatus having improved color purity can be realized.

In Examples 1 through 4, for the purpose of reducing the production cost of the projection type color image display apparatus, at least one holographic element having wavelength selectivity is provided either on the exit side or on the incident side of the liquid crystal display element, and thereby making the aperture of the projection lens smaller in Examples 5 and 6, for the purpose of improving color purity and increasing the light utilization ratio, an angle at which the white light beams enter a holographic element having wavelength selectivity is determined in the configuration where the holographic element is provided on the incident side of the liquid crystal display element.

Hereinafter, the configuration in which the effects of Examples 1 through 4 as well as the effects of the Examples 5 and 6 are simultaneously attained will be described.

(Example 7)

Figure 21:
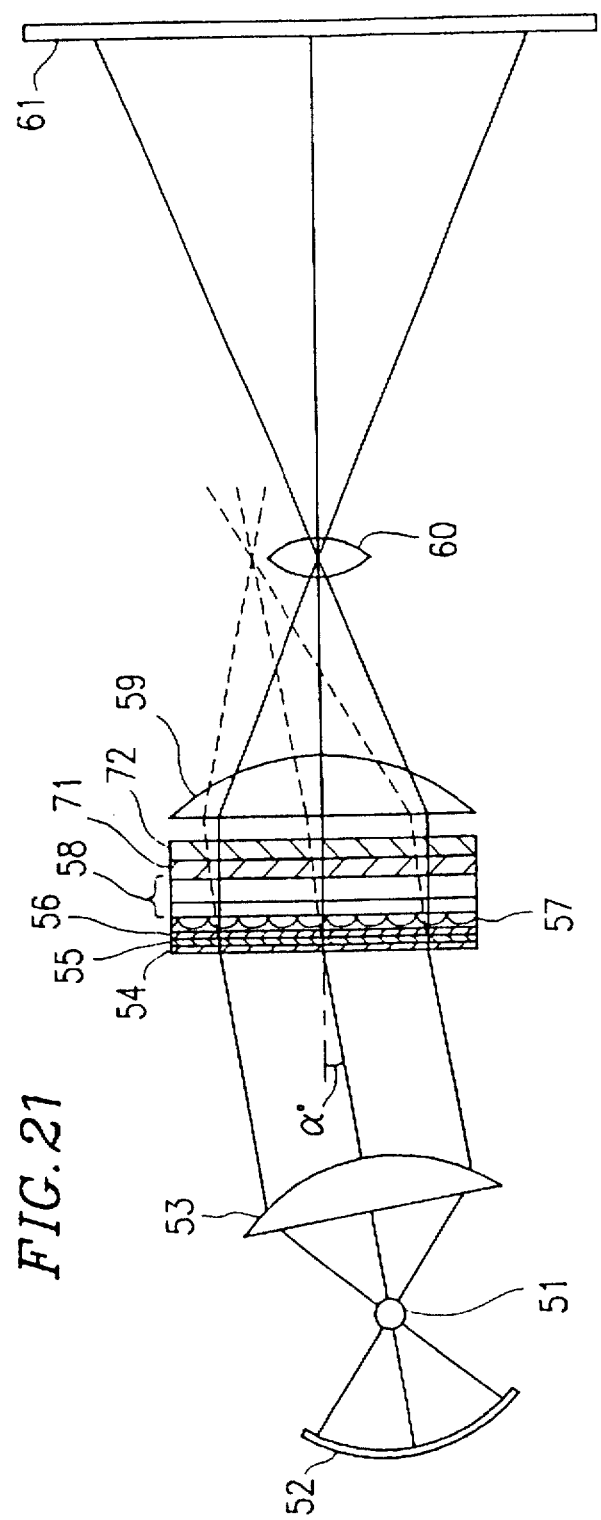
FIG. 21 is a schematic diagram showing the configuration of a seventh example of the projection type color image display apparatus of the invention.
Figure 22:
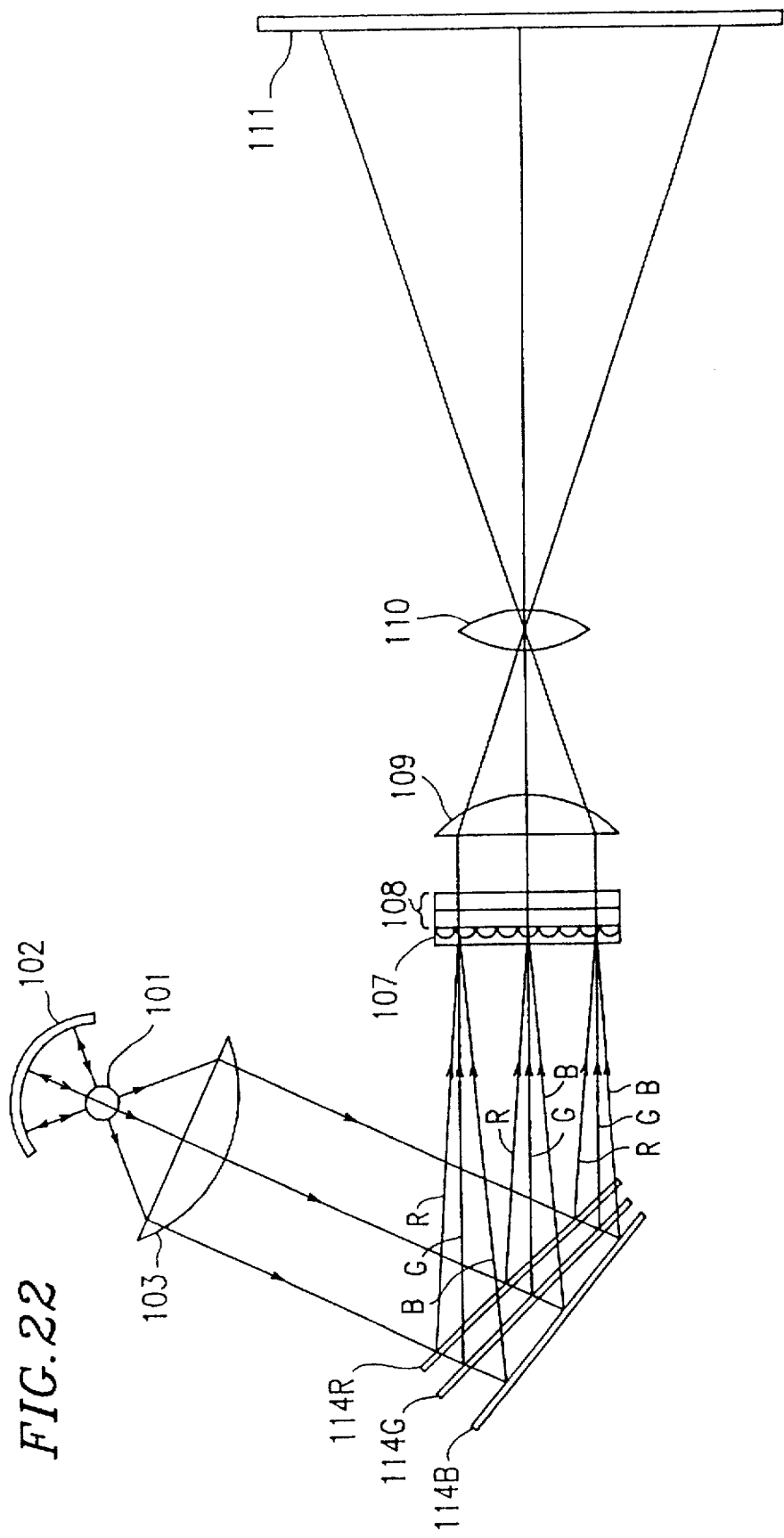
FIG. 22 is a schematic diagram showing the configuration of a conventional projection type color image display apparatus.

FIG. 21 shows an exemplified configuration of a projection type color image display apparatus comprising holographic elements 54, 55 and 56 disposed on the incident side of a liquid crystal display element 58 as well as holographic elements 71 and 72 disposed on the exit side of the liquid crystal display element 58. In this, example, similarly to Example 5, the white light enters the holographic elements 54, 55 and 56 on the incident side at the angle $\alpha°$ with respect to the normal thereof, and the angle $\alpha°$ is settled so as to satisfy the condition described in Example 5, i.e., formula (3). Accordingly, in the configuration shown in FIG. 21, the effects described in Examples 1 and 5 are simultaneously obtained. More specifically, in the configuration shown in FIG. 21, it is possible to adopt a projection lens having a comparatively small aperture, and it is also possible to minimize the length of the optical path from the light source to the liquid crystal display element. In addition, it is possible to improve the color purity of the projected image. Moreover, by settling the incident, angle $\alpha°$ with respect to the normal of the holographic element 54, 55 and 56 to satisfy the conditions mentioned in Example 6, the light utilization ratio also In addition, the configuration described in Example 5 can be modified so that beams of the color whose emission spectrum is the weakest among the R, G and B beams are arranged at the center of the R, G, and B beams. In this modification, the possibility that eclipses by a projection lens occur is reduced, even when the aperture of the projection lens is small as illustrated by the smaller circle in FIG. 23B, for the purpose of reducing the production cost of the projection type color image display apparatus. That is, according to this modification, both the effect described in Example 5 of improving the color purity and the effect described in Examples 3 and 4 of making the aperture of the projection lens smaller are attained. Similarly, in the case of modifying the configuration described in Example 6 to arrange beams of the color having the weakest emission spectrum among the R, G and B beams, the effect described in Example 6 and the effect described in Examples 3 and 4 are simultaneously attained.

Various other modifications will be apparent to and cain be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection type color image display apparatus comprising:

a light source for emitting white light;

first optical means for dividing the white light into a plurality of colored lights and for converging each of the plurality of colored lights to form a plurality of spots, the spots of each of the plurality of colored lights being formed at different positions from the spots of the other of the plurality of colored lights;

a liquid crystal display element including a plurality of pixels, the plurality of pixels corresponding to the plurality of spots formed by the first optical means and modulating the respective plurality of colored lights, whereby an image displayed by the liquid crystal display element is formed by the plurality of colored lights;

second optical means for diffracting the plurality of colored lights modulated by the liquid crystal display element to make a principal ray of each of the plurality of colored lights substantially parallel to a principal ray of the other of the plurality of colored lights, the second optical means including at least one holographic element having a uniform optical property over an entire surface thereof; and third optical means for receiving the plurality of colored lights from the second optical means and for projecting the image displayed by the liquid crystal display element while the image is enlarged.

2. A projection type color image display apparatus according to claim 1, wherein the second optical means includes two or more holographic elements for diffracting two or more of the plurality of colored lights different from one another, an angle of diffraction of each of the holographic elements being different from an angle of diffraction of the other holographic elements.

3. A projection type color image display apparatus according to claim 1, wherein the second optical means includes a holographic element for diffracting two or more of the plurality of colored lights at different angles.

4. A projection type color image display apparatus comprising:

a liquid crystal display element, including a plurality of pixels, for displaying an image;

a light source for emitting a white light;

optical means including at least one hologram having a wavelength selectivity and diffracting the white light to direct a plurality of colored lights toward different directions;

an array of micro-optical elements for converging each of the plurality of colored lights onto corresponding pixels of the liquid crystal display element; and projection means for receiving the image from the liquid crystal display element and for projecting the image, the projection means including at least a lens, wherein the optical means allows one of the plurality of colored lights having the weakest emission spectrum of the light source to enter the liquid crystal display element substantially perpendicularly thereto.

5. A projection type color image display apparatus according to claim 4, wherein the optical means includes two or more holographic elements for diffracting two or more of the plurality of colored lights different from one another, an angle of diffraction of each of the holographic elements being different from an angle of diffraction of the other holographic elements.

6. A projection type color image display apparatus according to claim 4, wherein the optical means includes a holographic element for diffracting two or more of the plurality of colored lights at different angles.

7. A projection type color image display apparatus comprising:

a liquid crystal display element, including a plurality of pixels, for displaying an image;

a light source for emitting a white light;

optical means for receiving the white light and for diffracting a plurality of colored lights toward different directions;

an array of micro-optical elements for converging each of the plurality of colored lights onto corresponding pixels of the liquid crystal display element; and projection means for receiving the image from the liquid crystal display element and for projecting the image displayed by the liquid crystal display element, the projection means including at least a lens, wherein the white light is incident on the optical means at an angle determined to prevent zero-order diffracted lights of the plurality of colored lights from entering an incident pupil of the lens of the projection means.

8. A projection type color image display apparatus according to claim 7, wherein the white light is incident an the optical means at an angle $\alpha°$ determined by:

$$\alpha° < \tan^{-1}(\phi/2L) + \tan^{-1}(p/2f)$$

where a distance between the optical means and the projection means is L, an effective aperture of the lens of the projection means is $\phi$, a focal length of each of the micro-optical elements is f, and a pitch of the micro-optical elements is p.

9. A projection type color image display apparatus according to claim 7, wherein the liquid crystal display element includes a display portion having a vertical length of a and a horizontal length of b; and wherein, when a<b, the white light is incident on the optical means in a horizontal direction at an angle $\alpha°$ satisfying the relationship:

$$\cos^{-1}(a/b) - 15° < \alpha° < \cos^{-1}(a/b) + 10°,$$

and when a>b, the white light is incident on the optical means in a vertical direction at an angle $\alpha°$ satisfying the relationship:

$$\cos^{-1}(b/a) - 15° < \alpha° < \cos^{-1}(b/a) + 10°.$$

10. A projection type color image display apparatus according to claim 8, wherein the optical means includes a plurality of holographic elements each having a hologram for diffracting one of th e plurality of colored lights, whereby the plurality of colored lights are diffracted by different holographic elements.

11. A projection type color image display apparatus according to claim 8, wherein the optical means includes a holographic element having a plurality of holograms each of which diffracts one of the plurality of colored lights.

12. A projection type color image display apparatus according to claim 9, wherein the optical means includes a plurality of holographic elements each having a hologram for diffracting one of the plurality of colored lights, whereby the plurality of colored lights are diffracted by different holographic elements.

13. A projection type color image display apparatus according to claim 9, wherein the optical means includes a holographic element having a plurality of holograms each of which diffracts one of the plurality of colored lights.

14. A projection type color image display apparatus according to claim 1, wherein the second optical means has no regularity of the optical property.

* * * * *